United States Patent
Yang

(10) Patent No.: US 11,394,909 B2
(45) Date of Patent: *Jul. 19, 2022

(54) IMAGE SENSOR

(71) Applicant: Samsung Electronics Co., Ltd., Suwon-si (KR)

(72) Inventor: Han Yang, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/212,375

(22) Filed: Mar. 25, 2021

(65) Prior Publication Data

US 2021/0211596 A1  Jul. 8, 2021

Related U.S. Application Data

(63) Continuation of application No. 16/670,268, filed on Oct. 31, 2019, now Pat. No. 10,979,659.

(30) Foreign Application Priority Data

Mar. 26, 2019  (KR) .................. 10-2019-0034548

(51) Int. Cl.
*H04N 5/217* (2011.01)
*H04N 5/365* (2011.01)
*H04N 5/369* (2011.01)
*H04N 5/378* (2011.01)

(52) U.S. Cl.
CPC ......... *H04N 5/3658* (2013.01); *H04N 5/3698* (2013.01); *H04N 5/378* (2013.01)

(58) Field of Classification Search
CPC .... H04N 5/3658; H04N 5/3698; H04N 5/378; H04N 5/3745; H04N 5/3765; H04N 5/374; H04N 5/357; H04N 5/369; H04N 5/3696

See application file for complete search history.

(56) References Cited

U.S. PATENT DOCUMENTS

| | | |
|---|---|---|
| 7,471,230 B2 | 12/2008 | Tooyama et al. |
| 8,031,241 B2 | 10/2011 | Maeda et al. |
| 8,358,360 B2 | 1/2013 | Koseki |
| 8,773,191 B2 | 7/2014 | Park et al. |
| 9,185,316 B2 | 11/2015 | Cheon et al. |

(Continued)

*Primary Examiner* — Kelly L Jerabek
(74) *Attorney, Agent, or Firm* — Harness, Dickey & Pierce, P.L.C.

(57) ABSTRACT

An image sensor includes a unit pixel, a first compensation circuit generating a first compensation voltage signal to compensate for horizontal noise corresponding to a variation in an input signal of a horizontal line coupled to the column line, a second compensation circuit generating a second compensation voltage signal to compensate for power noise corresponding to a variation in a power supply voltage, and a readout circuit including a first transistor, having a gate connected to an output terminal of the first compensation circuit, and a second transistor, connected to the first transistor in parallel, having a gate connected to an output terminal of the second compensation circuit, the readout circuit being configured to calibrate at least one of an output signal of the unit pixel and a ramp voltage signal, output by a ramp generator, using the first compensation voltage signal and the second compensation voltage signal.

20 Claims, 14 Drawing Sheets

(56) References Cited

U.S. PATENT DOCUMENTS

| | | |
|---|---|---|
| 9,264,639 B2 | 2/2016 | Guidash et al. |
| 9,723,241 B2 | 8/2017 | Yeh et al. |
| 10,979,659 B2 * | 4/2021 | Yang .................... H04N 5/3698 |
| 2012/0120300 A1 | 5/2012 | Dai |
| 2015/0264284 A1 | 9/2015 | Yoo |
| 2015/0288902 A1 | 10/2015 | Sun et al. |
| 2016/0330387 A1 | 11/2016 | Hwang |
| 2017/0163916 A1 | 6/2017 | Kim |
| 2017/0237914 A1 | 8/2017 | Cho et al. |
| 2017/0359492 A1 | 12/2017 | Cho et al. |
| 2018/0205903 A1 | 7/2018 | Ko et al. |

\* cited by examiner

IMAGE SENSOR

CROSS-REFERENCE TO RELATED APPLICATION(S)

This application is a continuation of U.S. application Ser. No. 16/670,268, filed on Oct. 31, 2019, which claims benefit of priority to Korean Patent Application No. 10-2019-0034548 filed on Mar. 26, 2019 in the Korean Intellectual Property Office, the disclosure of each of which is incorporated herein by reference in its entirety.

BACKGROUND

Example embodiments of inventive concepts relate to an image sensor.

An image sensor is a device receiving light and generating an electrical signal. In recent years, as a demand for image sensors has increased in various fields of application such as digital cameras, smartphones, tablet PCs, laptop computers, and/or vehicles, various methods have been proposed to improve noise characteristics of an image sensor.

SUMMARY

An aspect of inventive concepts is to provide an image sensor having significantly reduced power consumption and an increased size, while compensating both horizontal noise and power noise added to at least one of an output of a unit pixel and a ramp voltage.

According to some example embodiments of inventive concepts, an image sensor includes a unit pixel connected to a row line and a column line, a first compensation circuit configured to generate a first compensation voltage signal to compensate for horizontal noise, the horizontal noise corresponding to a variation in an input signal of a horizontal line, the variation in the input signal corresponding to a coupling of the horizontal line with the column line, a second compensation circuit configured to generate a second compensation voltage signal to compensate for power noise, the power noise corresponding to a variation in a power supply voltage, and a readout circuit. The readout circuit includes a first transistor having a gate connected to an output terminal of the first compensation circuit, and a second transistor connected in parallel to the first transistor, the second transistor having a gate connected to an output terminal of the second compensation circuit. The readout circuit is configured to calibrate at least one of an output signal of the unit pixel and a ramp voltage signal output by a ramp generator, the calibration based on the first compensation voltage signal and the second compensation voltage signal.

According to some example embodiments of inventive concepts, an image sensor includes a unit pixel connected to a row line and a column line, a first compensation circuit configured to generate a first compensation voltage signal to compensate for a first noise component, the first noise component corresponding to a variation in an input signal of a horizontal line, the variation in the input signal corresponding to a capacitive coupling of the horizontal line to the column line, a second compensation circuit configured to generate a second compensation voltage signal to compensate for a second noise component, the second noise component depending on a variation in a power supply voltage, and a ramp buffer configured to calibrate a ramp voltage signal and to output the calibrated ramp voltage signal, the ramp voltage signal being generated by a ramp generator, the calibrated ramp voltage signal based on the first compensation voltage signal and the second compensation voltage signal.

According to some example embodiments of inventive concepts, an image sensor includes a pixel array having a plurality of unit pixels connected to a plurality of row lines and a plurality of column lines, a first compensation circuit configured to generate a first compensation voltage signal to compensate for a first noise component added to an output signal of each of the unit pixels, a second compensation circuit configured to generate a second compensation voltage signal to compensate for a second noise component added to the output signal of each of the unit pixels, and a pixel bias circuit. The pixel bias circuit includes a first transistor configured to generate a bias current to drive each of the unit pixels, a second transistor connected in series to the first transistor, and a third transistor connected in parallel to the second transistor. A gate of the second transistor is configured to receive the first compensation voltage, and a gate of the third transistor is configured receive the second compensation voltage.

BRIEF DESCRIPTION OF DRAWINGS

The above and other aspects, features, and advantages of inventive concepts will be more clearly understood from the following detailed description, taken in conjunction with the accompanying drawings, in which.

DETAILED DESCRIPTION

Hereinafter, example embodiments of inventive concepts will be described with reference to the accompanying drawings.

Figure 1:
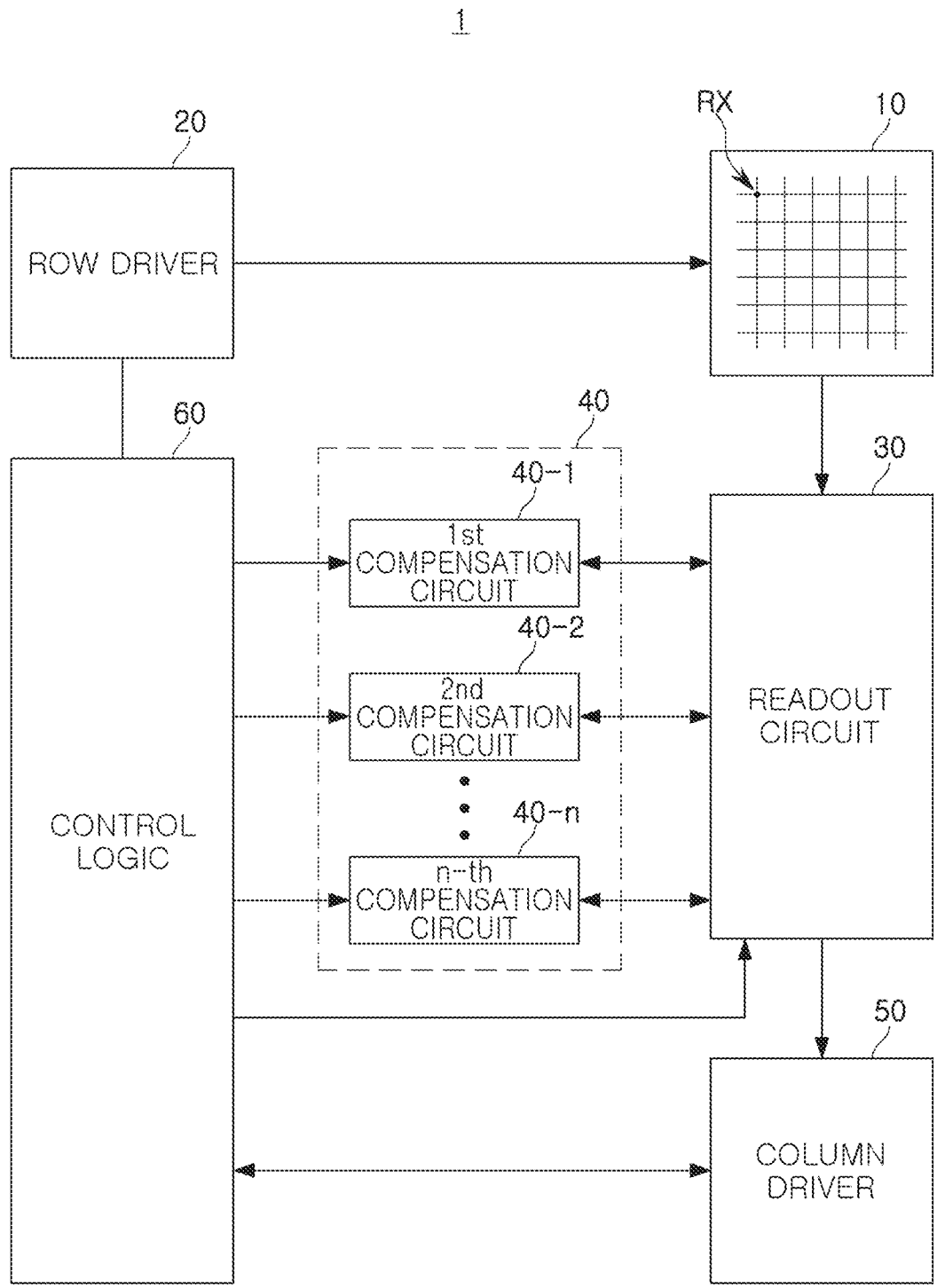
FIG. 1 is a block diagram of an image sensor according to example embodiment of inventive concepts.
Figure 2A:
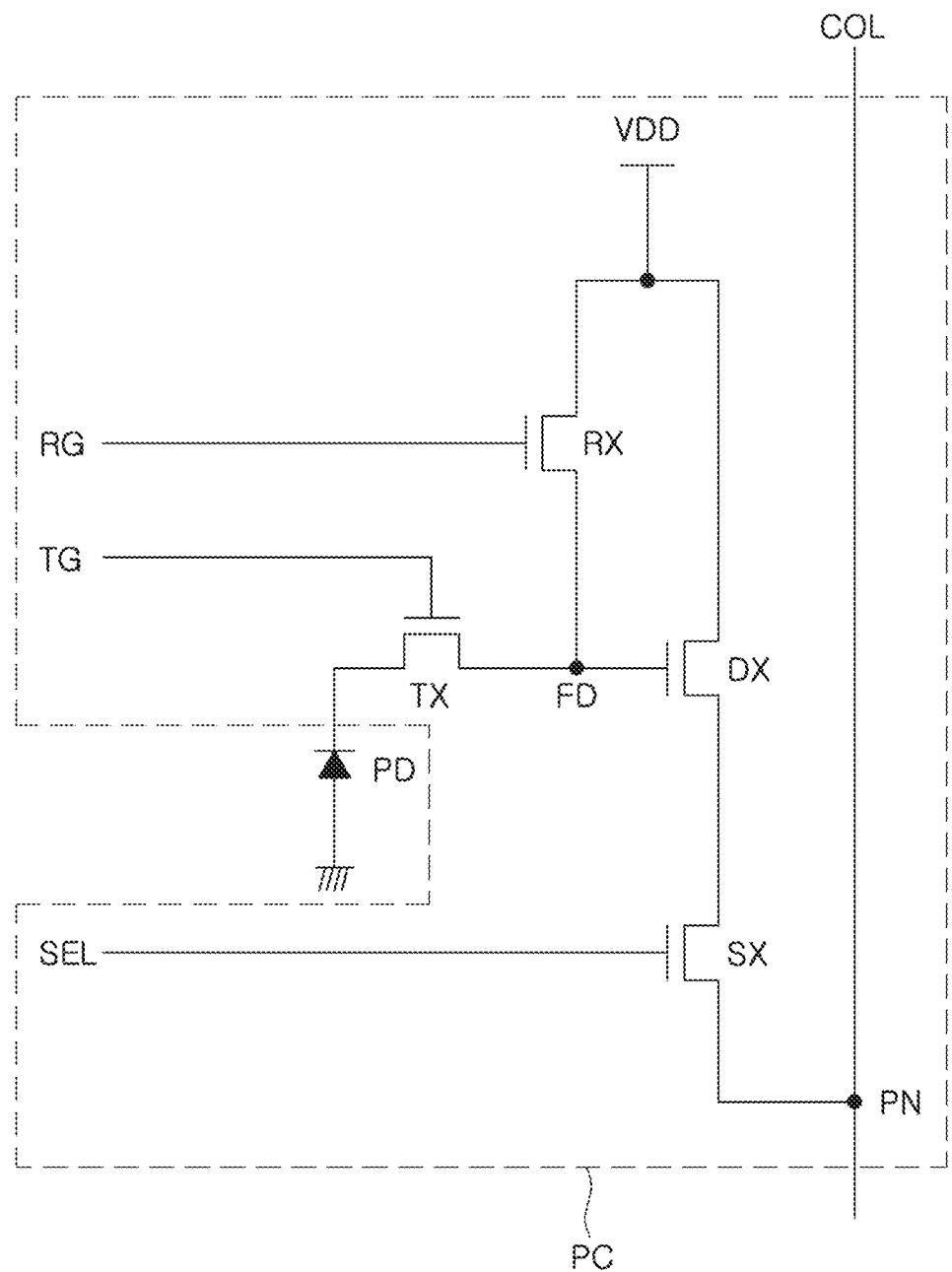
FIGS. 2A and 2B are circuit diagrams illustrating examples of a unit pixel included in a pixel array of FIG. 1.
Figure 2B:
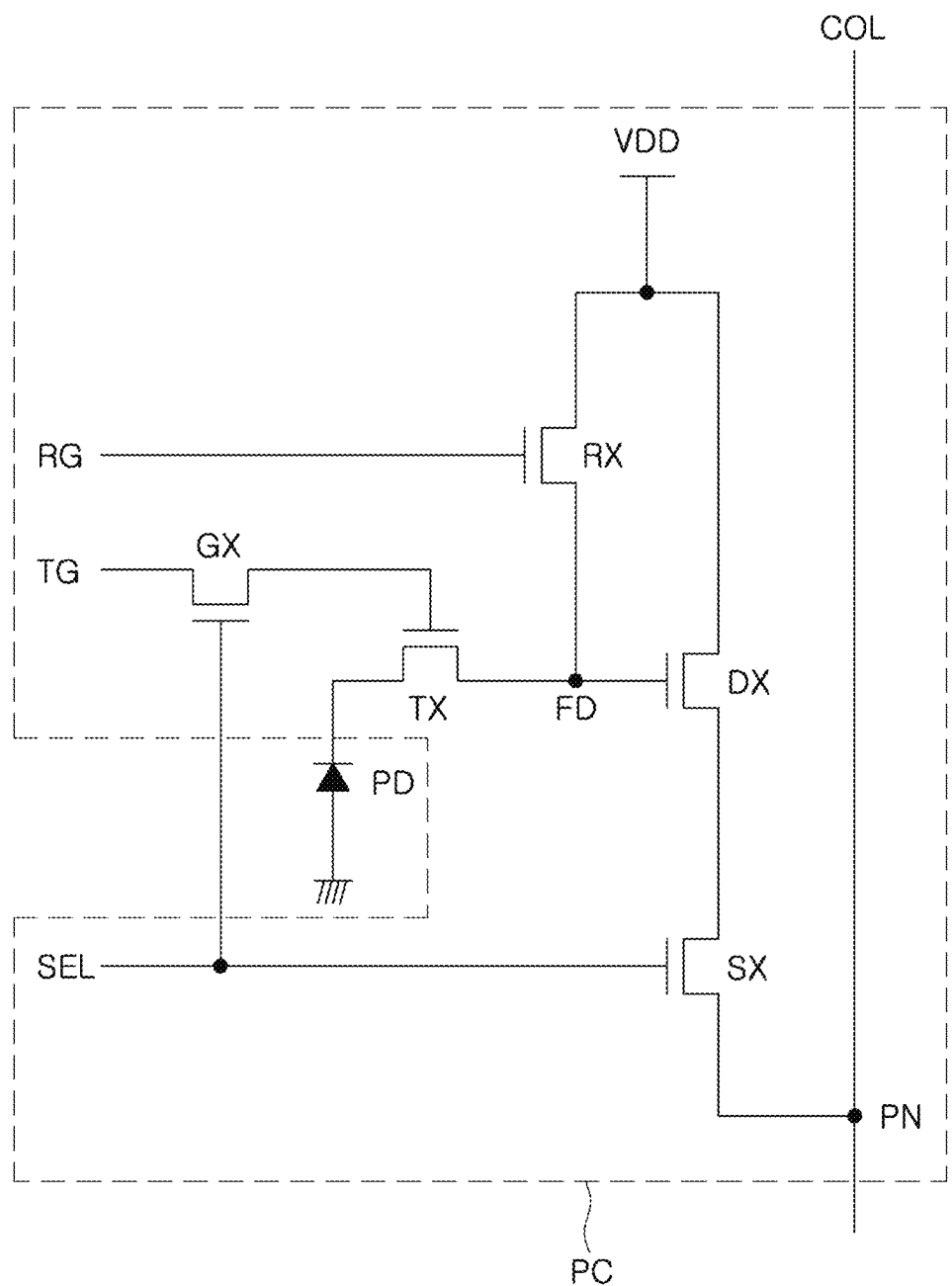

FIG. 1 is a block diagram of an image sensor according to example embodiment of inventive concepts, and FIGS. 2A and 2B are circuit diagrams illustrating examples of a unit pixel included in a pixel array of FIG. 1.

Referring to FIG. 1, an image sensor 1 according to example embodiments may include a pixel array 10, a row driver 20, a readout circuit 30, a compensation circuit 40, a column driver 50, and a control logic 60.

The pixel array 10 may include a plurality of unit pixels PX. In the case in which the unit pixels PX are arranged in a matrix form, they may be arranged at intersections of a plurality of row lines, e.g. word lines, and a plurality of column lines, e.g. bit lines.

Each of the unit pixels PX may include a photoelectric element configured to generate charges in response to light. For example, a photoelectric element may include a photodiode PD. In addition, each of the unit pixels PX may include a pixel circuit configured to generate a pixel signal from charges generated by a photodiode. In some example embodiments, a pixel circuit may include a transfer transistor, a drive transistor, a select transistor, and a reset transistor. The pixel circuit may detect a reset voltage and a pixel voltage from each of the unit pixels PX, and a pixel signal may be obtained, e.g. calculated, based on a difference between the reset voltage and the pixel voltage. The pixel voltage may be a voltage reflecting the amount of charges generated by a photodiode included in each of the unit pixels PX. Each of the unit pixels PX may have a three-transistor (3T) structure, a four-transistor (4T) structure, a five-transistor (5T) structure, or the like, depending on the number of transistors included in a pixel circuit. The unit pixels PX may have a structure in which two different unit pixels PX share at least one transistor. Detailed examples of the unit pixels PX are illustrated in FIGS. 2A and 2B.

FIG. 2A illustrates a unit pixel having a 4T structure, and FIG. 2B illustrates a 5T structure.

Referring to FIG. 2A, each of the unit pixels PX may include a photodiode PD and a pixel circuit PC. The pixel circuit PC may include a floating diffusion node, or a floating diffusion FD, a reset transistor RX, a drive transistor DX, a select transistor SX, and a transfer transistor TX.

A photodiode PD may generate charges in response to incident light. The charges, generated by the photodiode PD, may be accumulated at or on the floating diffusion FD.

When the reset transistor RX is turned on or activated by a reset control signal RG, a voltage of the floating diffusion FD may be reset to a power supply voltage VDD. When the voltage of the floating diffusion FD is reset, the select transistor SX is turned on or activated by a select control signal SEL, and thus, a reset voltage signal may be output to a column line COL through a pixel node PN.

When the transfer transistor TX is turned on or activated by a transfer control signal TG after the reset voltage is output to the column line COL, the charges, generated by the photodiode PD, may migrate to the floating diffusion FD. The drive transistor DX may operate as a source-follower amplifier configured to amplify a voltage of, e.g. at, the floating diffusion FD. When the select transistor SX is turned on or activated by the select control signal SEL, a pixel voltage signal corresponding to the charge, generated by the photodiode PD, may be output to the column line COL through a pixel node PN.

Referring to FIG. 2B, each of the unit pixels PX may have a 5T structure further including a transfer control transistor GX in addition to the 4T structure of FIG. 2A. The transfer control transistor GX may be connected between an input terminal of a transfer control signal TG and a gate of a transfer transistor TX, and may be turned on, e.g. activated, or turned off, e.g. deactivated, by a select control signal SEL. When the transfer control transistor GX is turned on by the select control signal SEL, the transfer transistor TX may be turned on and turned off by the transfer control signal TG. Since the unit pixels PX, illustrated in FIGS. 2A and 2B, are example unit pixels, an image sensor according to example embodiments of inventive concepts may include unit pixels having various structures such as a 3T structure and/or the like. The pixel array 10 may be a homogenous pixel array having unit pixels all of the same or similar structure, or may be a heterogeneous pixel array having unit pixels of different structure; inventive concepts are not limited thereto.

Referring back to FIG. 1, a row driver 20 may drive a pixel array 10 row-by-row. For example, the row driver 20 may generate a transfer control signal TG to control the transfer transistor TX of the pixel circuit PC, a reset control signal RG to control the reset transistor RX, a select control signal SEL to control the select transistor, and/or the like.

The row driver 20 may provide a select control signal SEL, having a logical high value, to a pixel array 10 such that the select transistor SX is turned on (or activated) to select one row line among a plurality of row lines of the pixel array 10. The row driver 20 may provide the reset control signal RG, having a logical high value, to the selected row line to turn on (or activate) the reset transistor RX. Accordingly, a voltage of a floating diffusion FD may be reset to a power supply voltage VDD, and a reset voltage signal may be output to the pixel node PN when the select transistor SX is turned on.

Then, the row driver 20 may provide the transfer control signal TG, having a logical high value, to the pixel array 10 to turn on, e.g. activate, the transfer transistor TX. Accordingly, charges generated by a photodiode PD may be transferred to the floating diffusion FD. A voltage of the floating diffusion FD may vary depending on the amount of the charge transferred through the transfer transistor TX. Accordingly, a gate potential of the drive transistor DX may also vary and, when the select transistor SX is turned on, a pixel voltage signal may be output to the pixel node PN.

The row driver 20 may output, e.g. sequentially output, the reset voltage signal and the pixel voltage signal row-by-row while repeatedly performing such an operation on all row lines of the pixel array 10.

A readout circuit 30 may include a pixel bias circuit, a sampler, and/or a counter. Each of the unit pixels PX may be provided with the pixel bias circuit and the sampler.

The pixel bias circuit may drive each of the unit pixels PX and may adjust amplitudes of a reset voltage signal and a pixel voltage signal, output from each of the unit pixels PX. The sampler may compare amplitudes of the reset voltage signal and the pixel voltage signal, output from each of the unit pixels PX, with an amplitude of a ramp voltage signal Vramp. The sampler may output a comparison signal CMP. The counter may perform a counting operation using the comparison signal CMP, generated by the sampler, and a count clock signal CLKC, to generate a digital signal DS. The readout circuit 30 will be described in detail later with reference to FIG. 3.

A compensation circuit 40 may generate a compensation voltage signal Vcomp to compensate for noise components included in an output of each of unit pixels PX, the ramp voltage signal Vramp, and/or the like. The noise components may include a power noise component generated by a ripple voltage or the like of a power supply voltage VDD. The noise components may include a horizontal noise component generated by coupling, e.g. capacitive coupling, between a horizontal line such as a transfer control signal (TG) line and a column line, or the like.

The compensation circuit 40 may include a plurality of compensation circuits 40-1 to 40-n configured to compensate for different noise components. The noise components compensated by respective compensation circuits 401 to 40-*n* may be different from each other. For example, a first compensation circuit 40-1 may generate a first compensation voltage signal Vcomp1 used to compensate for a power noise component added to an output signal of each of the unit pixels PX. A second compensation circuit 40-2 may generate a second compensation voltage signal Vcomp2 used to compensate for horizontal noise component added to the output signal of each of the unit pixels PX. An n-th compensation circuit 40-*n* may generate an n-th compensation voltage signal Vcompn used to compensate for a power noise component added to the ramp voltage signal Vramp. The first to n-th compensation voltages Vcomp1 to Vcompn, generated by the first to n-th compensation circuits 40-1 to 40-*n*, may be transferred to the readout circuit 30 to be used to compensate for various noise components.

A column driver 50 may receive various control signals from a control logic 60 to control a column address and a column scan of the pixel array 10. The column driver 50 may include a latch and/or buffer circuit configured to temporarily store a digital signal DS output from the readout circuit 30, an amplifier circuit, and/or the like.

The control logic 60 may control operations of the row driver 20, the readout circuit 30, the compensation circuit 40, and the column driver 50. The control logic 60 may include a timing controller configured to control operating timings of the row driver 20 to the column driver 50, an image signal processor configured to process image data, and/or the like.

Figure 3:
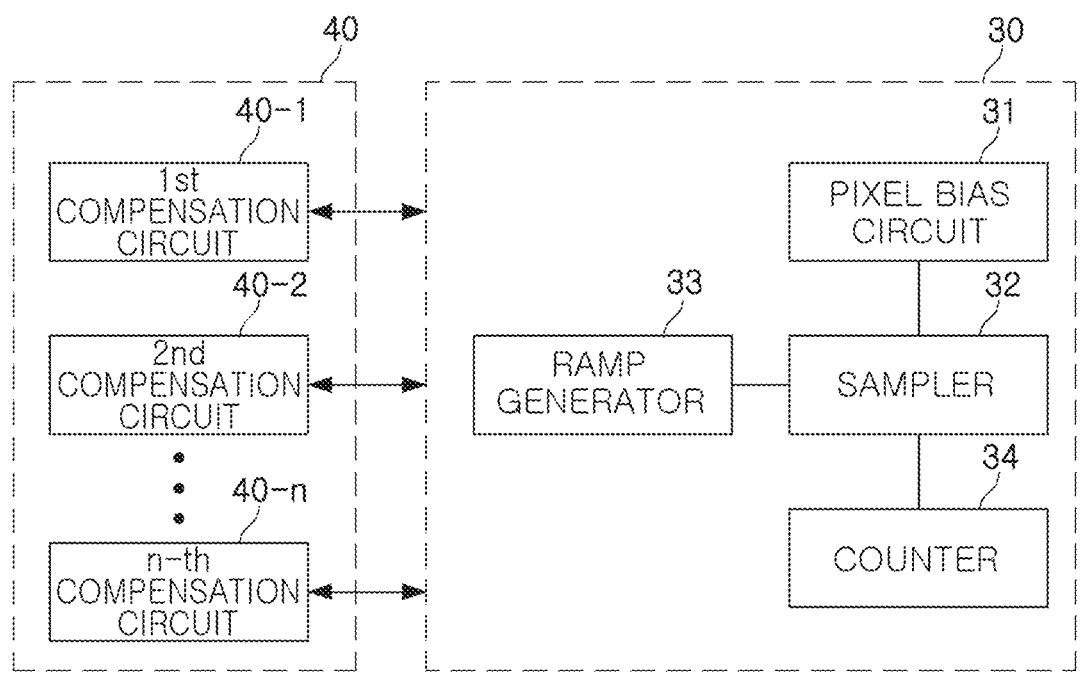
FIG. 3 is a block diagram illustrating a configuration of a readout circuit of FIG. 1.

FIG. 3 is a block diagram illustrating a configuration of the readout circuit 30 of FIG. 1.

Referring to FIG. 3, the readout circuit 30 may include a pixel bias circuit 31, a sampler 32, a ramp generator 33, and a counter 34. Each of the unit pixels PX of a pixel array 10 may be provided with the pixel bias circuit 31 and the sampler 32.

The pixel bias circuit 31 may be connected between a pixel node PN of each of the unit pixels PX and a ground terminal. The pixel bias circuit 31 may drive each of the unit pixels PX. For example, the pixel bias circuit 31 may generate bias current and may supply the generated bias current to each of the unit pixels PX.

In some example embodiments, the pixel bias circuit 31 may compensate for a noise component, added to an output of each of the unit pixels PX, using a compensation voltage signal Vcomp. Noise components, which may be added to a reset voltage signal and a pixel voltage signal, may include a power noise component generated by a ripple voltage, and various horizontal noise components generated by coupling, e.g. capacitive coupling, between various horizontal lines and a column line. However, inventive concepts are not limited thereto, and there may be other noise components.

The compensation circuit 40 may generate a compensation voltage signal Vcomp to compensate for various noise components involved in at least one of an output $V_{PN}$ of each of the unit pixels PX and the ramp voltage signal Vramp. The compensation circuit 40 may include a plurality of compensation circuits 40-1 to 40-*n*, depending on the type and/or the number of noise components.

The ramp generator 33 may generate a ramp voltage signal Vramp which may vary linearly, e.g. at a constant rate of slope. For example, the ramp generator 33 may generate a ramp voltage Vramp falling at a constant rate of a slope during a period in which a count enable signal CNT_EN is enabled.

The sampler 32 may be connected to a plurality of unit pixels PX, connected to a row line selected by the row driver 20, through a column line, and may detect a reset voltage signal and a pixel voltage signal from the unit pixels PX. Alternatively or additionally, the sampler 32 may compare the detected reset voltage signal and the detected pixel voltage signal with the ramp voltage signal Vramp, generated by the ramp generator 33, to output a comparison signal CMP. For example, when the amplitude of the detected reset voltage signal (or the detected pixel voltage signal) is less than the amplitude of the ramp voltage signal Vramp, the sampler 32 may output a comparison signal CMP having a logical high value. On the other hand, when the amplitude of the detected reset voltage signal (or the detected pixel voltage) is greater than or equal to the amplitude of the ramp voltage signal Vramp, the sampler 32 may output the comparison signal CMP having a logical low value.

In some example embodiments, the sampler 32 may include a correlated double sampler configured to perform a correlated double sampling operation. Alternatively or additionally, the sampler 32 may include a digital double sampler configured to perform a double sampling operation after converting each of the reset and pixel voltage signals into a digital signal.

The sampler 32 may include a ramp buffer RB configured to output the ramp voltage signal Vramp generated by the ramp generator 33, and a comparator COMP configured to compare each of the reset and pixel voltage signals with the ramp voltage signal Vramp. The ramp buffer RB and the comparator COMP will be described in more detail with reference to FIG. 4.

In some example embodiments, the ramp buffer RB may compensate for various noise components, included in at least one of an output of each of the unit pixels PX and the ramp voltage signal Vramp, using one or more compensation voltage signals Vcomp generated by the compensation circuit 40.

The counter 34 may generate a digital signal DS based on the comparison signal CMP generated by the sampler 32, and based on a count clock signal CLKC. For example, when the sampler 32 performs a correlated double sampling operation on the reset voltage signal to output the comparison signal CMP, the counter 34 may perform a counting operation in synchronization with the count clock signal CLKC until the comparison signal CMP transitions to a logical low value, to generate a first count value. When the sampler 32 performs a correlated double sampling operation on the pixel voltage signal to output the comparison signal CMP, the counter 34 may perform a counting operation on the pixel voltage signal in synchronization with the count clock signal CLKC until the comparison signal CMP transitions to a logic low value, to generate a second count value. The counter 34 may subtract the first count value from the second count value to generate a digital signal DS.

Figure 4:
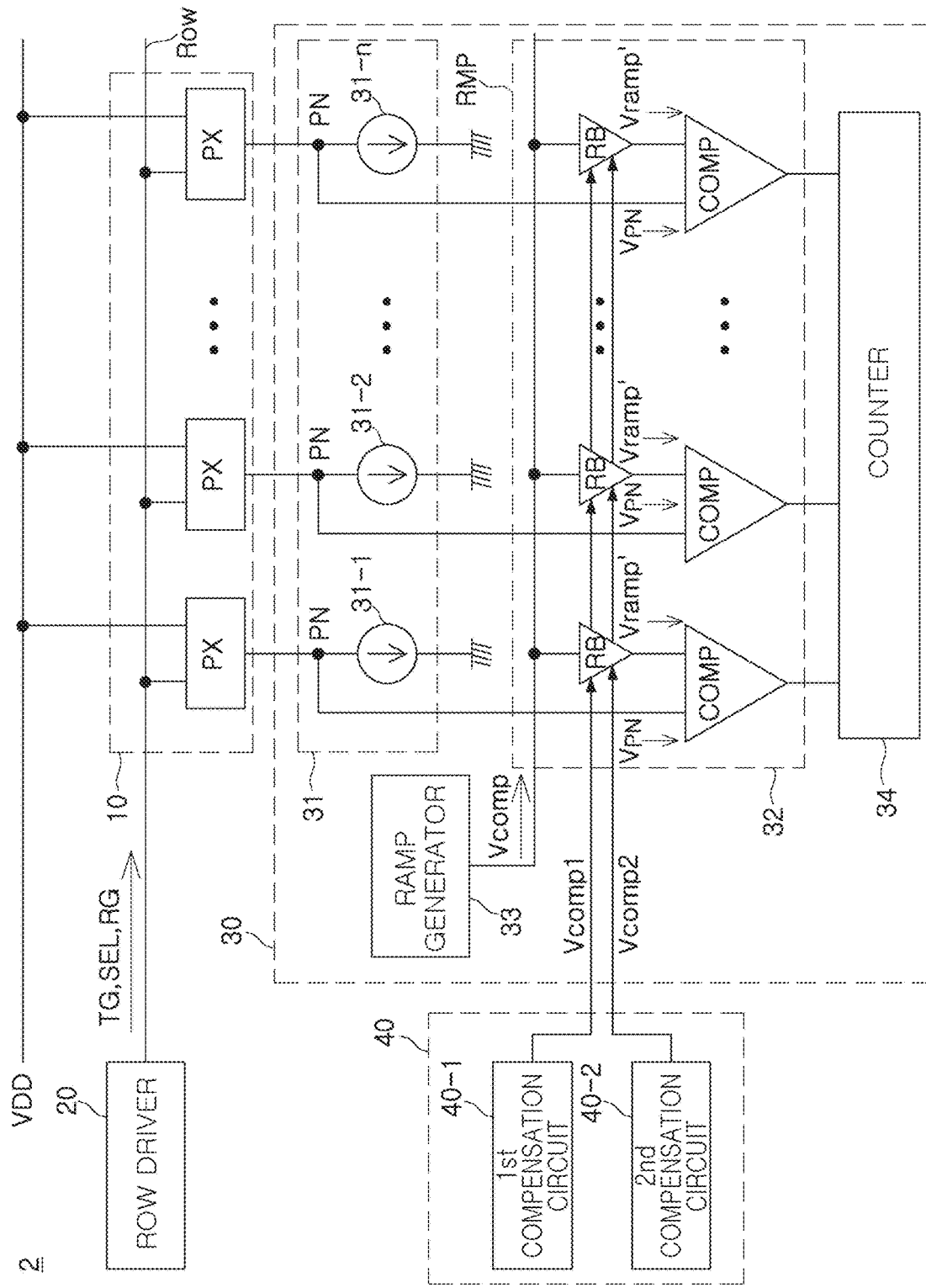
FIG. 4 is a block diagram of an image sensor according to some example embodiments of inventive concepts.

FIG. 4 is a block diagram of an image sensor according to some example embodiments of inventive concepts.

Referring to FIG. 4, an image sensor 2 may include a pixel array 10, a row driver 20, a compensation circuit 40, and a readout circuit 30.

The pixel array 10 may include a plurality of unit pixels PX arranged at intersections of row lines ROW and column lines COL in the pixel array 10. The image sensor 2 may employ a Bayer pattern. For example, pixels within the pixel array PX may include filters having different colors. When the image sensor 2 employs Bayer pattern, the unit pixels PX may be arranged to receive red light, green light, and blue light, respectively or may be arranged to receive magenta (Mg) light, yellow (Y) light, cyan (Cy) light and/or white (W) light. A row address and a row scan of the pixel array 10 may be controlled by the row driver 20.

The compensation circuit 40 may generate a compensation voltage signal Vcomp to compensate for one or more noise components added to at least one of an output $V_{PN}$ of each of the unit pixels PX or the ramp voltage signal Vramp generated by the ramp generator 33.

The compensation circuit 40 may include a first compensation circuit 40-1 and a second compensation circuit 40-2. The first compensation circuit 40-1 may generate a first compensation voltage signal Vcomp1 to compensate for a first noise component. The first noise component may be, for example, horizontal noise added to an output $V_{PN}$ of each of the unit pixels PX, by coupling (e.g. capacitive coupling) between a transfer control signal (TG) line and a column line. The second compensation circuit 40-2 may generate a second compensation voltage Vcomp2 to compensate for a second noise component. The second noise component may be, for example, power noise added to an output $V_{PN}$ of each of the unit pixels PX. FIG. 4 illustrates the compensation circuit 40 as including the two compensation circuits 40-1 and 40-2. However, the configuration of the compensation circuit 40 is merely example and is not intended to example embodiments of inventive concepts. For example, the compensation circuit 40 may include a plurality of different compensation circuits depending on type and/or number of noise components.

The compensation voltage signals Vcomp1 and Vomp2, generated by the compensation circuit 40, may be transferred to a ramp buffer RB of the readout circuit 30 to be used to compensate for one or more noise components added to at least one of an output $V_{PN}$ of each of the unit pixels PX and the ramp voltage Vramp generated by the ramp generator 33.

The readout circuit 30 may include a pixel bias circuit 31, a sampler 32, a ramp generator 33, and a counter 34.

The pixel bias circuit 31 may be connected between an output terminal PN of each of the unit pixels PX and a ground terminal, and may generate bias current to drive each of the unit pixels PX.

The ramp generator 33 may generate a ramp voltage signal Vramp, increasing or decreasing in the form of a ramp such as a linear or a non-linear or a piecewise-linear ramp, and may provide the ramp voltage signal Vramp to the sampler 32.

The sampler 32 may include a ramp buffer RB and a comparator COMP.

The ramp buffer RB may calibrate and output the ramp voltage signal Vramp using the compensation voltage Vcomp1 and Vcomp2 received from the compensation circuit 40. For example, the ramp buffer RB may add the first and second compensation voltage signals Vcomp1 and Vcomp2, received from the compensation circuit 40, to the ramp voltage signal Vramp to calibrate and output the ramp voltage signal Vramp. The calibrated ramp voltage Vramp' may be transferred to the comparator COMP, and may be used to generate the comparison signal CMP together with the output signal $V_{PN}$ of each of the unit pixels PX.

In some example embodiments, the calibrated ramp voltage Vramp' may be a voltage signal which compensates for various noise components added to the ramp voltage signal Vramp. In some example embodiments, the calibrated ramp voltage Vramp' may be a voltage signal for compensating for various noise components added to the ramp voltage signal Vramp.

The comparator COMP may compare the calibrated ramp voltage Vramp' with an output signal $V_{PN}$ of each of the unit pixels PX, to reduce and/or compensate for an error of the comparison signal CMP caused by the various noise components of the output signal $V_{PN}$.

The comparator COMP may compare the output signal $V_{PN}$ with the ramp voltage signal Vramp', output from the ramp buffer RB, to output the comparison signal CMP.

The counter 34 may generate a digital signal DS using the comparison signal CMP output from the sampler 32. For example, the counter 34 may generate a digital signal DS based on the comparison signal CMP and a clock signal provided from the control logic 60.

The image sensor 2 according to some example embodiments may simultaneously compensate for various noise components, added to at least one of an output of each of unit pixels PX or a ramp voltage signal Vramp, to improve noise characteristics and/or linearity of an image sensor and to improve, e.g. optimize, performance of the image sensor. Moreover, the image sensor 2 may significantly reduce a size and/or power consumption while including a plurality of compensation circuits. Hereinafter, examples of the image sensor 2 will be described with reference to FIGS. 5 to 7.

Figure 5:
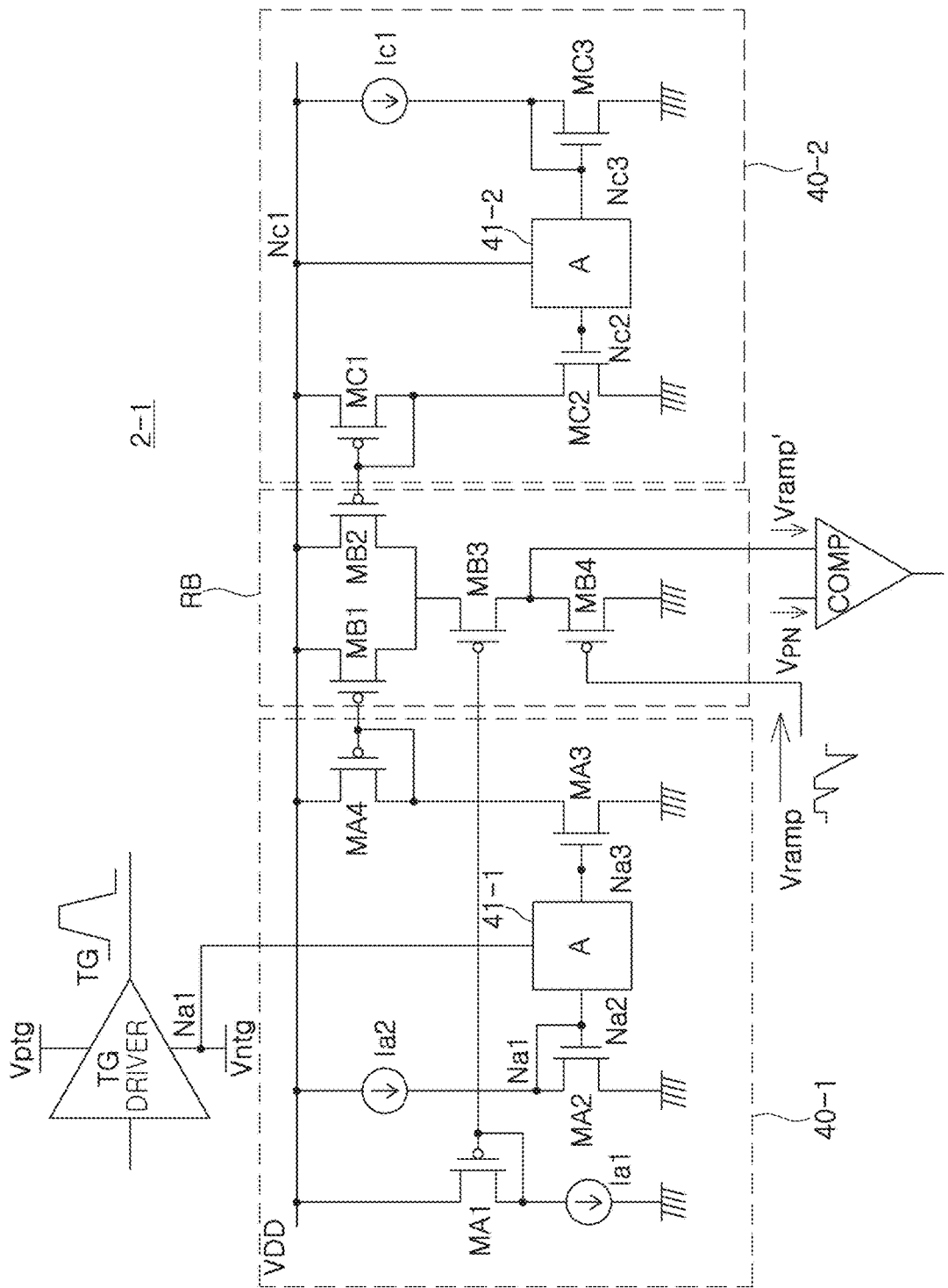
FIG. 5 is a partial equivalent circuit diagram illustrating an example of the image sensor of FIG. 4.
Figure 6A:
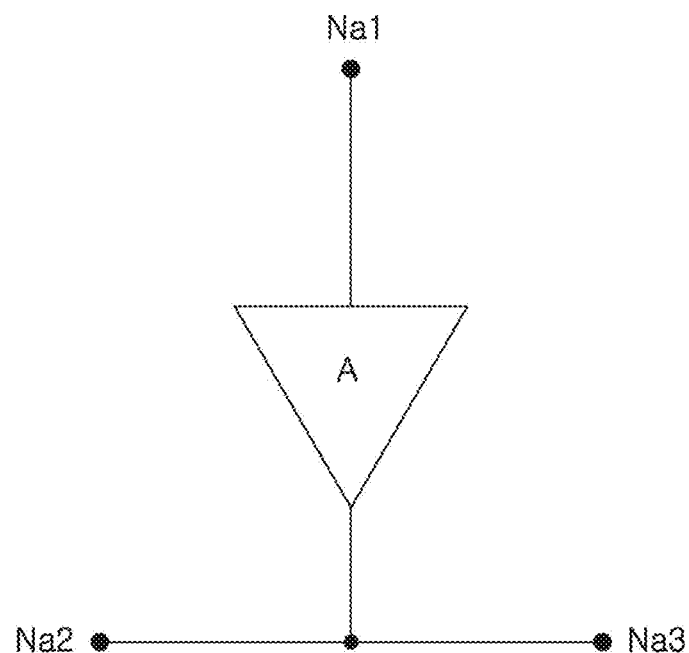
FIGS. 6A and 6B are circuit diagrams illustrating examples of an amplifier unit of FIG. 4.
Figure 6B:
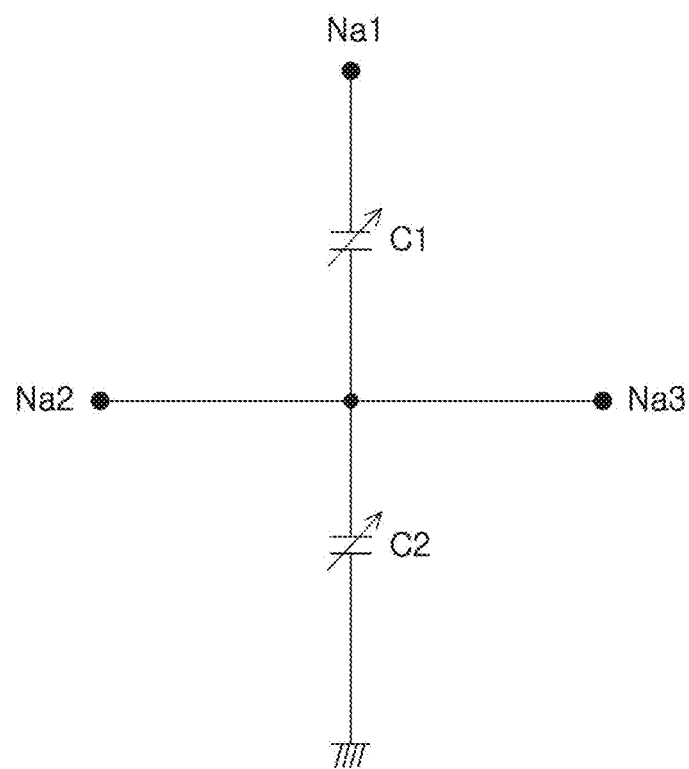

FIG. 5 is a partial equivalent circuit diagram illustrating an example of the image sensor of FIG. 4, and FIGS. 6A and 6B are circuit diagrams illustrating examples of an amplifier unit of FIG. 4.

Referring to FIG. 5, an image sensor 2_1 may include a ramp buffer RB, a first compensation circuit 40-1, and a second compensation circuit 40-2.

The ramp buffer RB may calibrate and output a ramp voltage signal Vramp output from a ramp generator. To this end, the ramp buffer RB may include an input transistor MB4 and load transistors MB1 and MB2. The ramp buffer RB may further include a cascade transistor MB3, connected to the load transistors MB1 and MB2 in series, to stabilize drain current of the load transistors MB1 and MB2. Although the figures illustrate transistors MB1, MB2, MB3, and MB4 as being PMOS transistors, inventive concepts are not limited thereto.

An input transistor MB4 may have a gate connected to an output terminal of the ramp generator. In some example embodiments, a body and a source of the input transistor MB4 may be short-circuited to remove a body effect of the input transistor MB4.

The load transistor MB1 and MB2 may be in parallel and may include a first load transistor MB1 and a second load transistor MB2, connected to a power supply voltage VDD and a first node Nc1. A gate of the first load transistor MB1 may be connected to the first compensation circuit 40-1, and a gate of the second load transistor MB2 may be connected to the second compensation circuit 40-2. In FIG. 5, the load transistors MB1 and MB2 including the two load transistors MB1 and MB2 are illustrated. However, the configuration of the load transistors MB1 and MB2 is merely example and is not intended to example embodiments of inventive concepts. For example, the load transistors MB1 and MB2 may include first to n-th load transistors MB1 to MBn, connected in parallel to each other, depending on type and/or number of noise components.

The first compensation circuit 40-1 may generate a first compensation voltage Vcomp1 to compensate for first noise added to an output of each of unit pixels PX. For example, the first compensation circuit 40-1 may generate the first compensation voltage Vcomp1 by amplifying a change in amplitude of a transfer control signal TG (refer to FIGS. 2A and 2B) to compensate for horizontal noise added to a pixel voltage signal of each of the unit pixels PX. When a low, e.g. a minimum, voltage Vntg of the transfer control signal TG varies depending on variation of the transfer control signal TG, the first compensation circuit 40-1 may amplify an amount of the variation of the minimum voltage Vntg of the transfer control signal TG with a specific (or, alternatively, predetermined) gain, to generate the first compensation voltage Vcomp1.

The first compensation circuit 40-1 may include first to fourth transistors MA1 to MA4, first and second current sources Ia1 and Ia2, and an amplifier unit 41-1. Although the first and four transistors MA1 and MA4 are illustrated as being PMOS transistors, and the second and third transistors MA2 and MA3 are illustrated as being NMOS transistors, inventive concepts are not limited thereto.

The amplifier unit 41-1 may be connected between a gate of the second transistor MA2 and a gate of the third transistor MA3, and may amplify a change in amplitude of an input of a horizontal line. For example, the amplifier unit 41-1 may amplify a change in amplitude of the transfer control signal TG with a specific (or, alternatively, predetermined) gain. The amplifier unit 41-1 may include a single amplifier, as illustrated in FIG. 6A, or may include a first variable capacitor C1 and a second variable capacitor C2 connected in series, as illustrated in FIG. 6B. In the case of FIG. 6B, gain of the amplifier unit 41-1 may be calculated depending on capacitance rates of the first and second variable capacitors C1 and C2. For example, the gain of the amplifier unit 41-1 may be calculated as a ratio of the capacitance of the first variable capacitor C1 to total capacitance of the first and second variable capacitors C1 and C2. The amplifier unit 41-1 may include various structures capable of adjusting a gain A, in addition to examples of FIGS. 6A and 6B.

The third and fourth transistors MA3 and MA4 may be connected in series between a power supply voltage VDD and a ground terminal. The third transistor MA3 may constitute a current mirror circuit together with the second transistor MA2 and the second current source Ia2. The fourth transistor MA4 may constitute a current mirror circuit together with the first load transistor MB1 of the ramp buffer RB.

A gate voltage of the first load transistor MB1 of the ramp buffer RB may be scaled by current-voltage characteristics of the third and fourth transistors MA3 and MA4. For example, the gate voltage of the first load transistor MB1 may have a value obtained by scaling a voltage of the third transistor MA3 using a transconductance ratio of the third and fourth transistors MA3 and MA4.

Current flowing to a drain of the first load transistor MB1 may also vary as the gate voltage of the first load transistor MB1 varies. Drain current of the first load transistor MB1 may flow to a second node N2 to drop the amplitude of the ramp voltage signal Vramp by the amplitude of the first compensation voltage signal Vcomp1.

In some examples embodiments, the first compensation circuit 40-1 may amplify an amount of variation of or corresponding to the minimum voltage Vntg to generate a first compensation voltage Vcomp1, given by Equation 1.

$$V_{comp1} = A \left( \frac{g_{m,MA3}}{g_{m,MA4}} \right) \left( \frac{g_{m,MB1}}{g_{m,MB4}} \right) \Delta Vntg \qquad \text{Equation 1}$$

where $g_{m,MA3}$ denotes transconductance of the third transistor MA3 of the first compensation circuit 40-1, $g_{m,MA4}$ denotes transconductance of the fourth transistor MA4 of the first compensation circuit 40-1, $g_{m,MB1}$ denotes transconductance of the first load transistor MB1 of the ramp buffer RB, $g_{m,MB4}$ denotes transconductance of an input transistor MB4 of the ramp buffer RB, and $\Delta Vntg$ denotes an amount of change in a minimum value of the transfer control signal TG.

Referring to Equation 1, the first compensation circuit 40-1 may change the transconductance of each of the third and fourth transistors MA3 and MA4 to adjust the amplitude of the first compensation voltage signal Vcomp1.

The second compensation circuit 40-2 may generate a second compensation voltage Vcomp2 to compensate for second noise added to at least one of the output of each of the unit pixel PX or the ramp voltage signal Vramp. For example, the second compensation circuit 40-2 may generate a second compensation voltage Vcomp2 by amplifying a change in magnitude of the power supply voltage VDD to compensate for power noise added to a reset voltage signal of each of the unit pixels PX.

The second compensation circuit 40-2 may include first to third transistors MC1 to MC3, a first current source Ic1, and an amplifier unit 41-2. Although the first transistor MC1 is illustrated as being a PMOS transistor, and second and third transistors MC2 and MC3 are illustrated as being NMOS transistors, inventive concepts are not limited thereto.

The amplifier unit 41-2 may be connected between a gate of the second transistor MC2 and a gate of the third transistor MC3 to amplify the change in magnitude of the power supply voltage VDD by a specific (or, alternatively, predetermined) gain A. A structure of the amplifier unit 41-2 may correspond to one of FIG. 6A and FIG. 6B. The amplifier unit 41-2 may have various structures, capable of adjusting the gain A, in addition to the structures described above with reference FIGS. 6A and 6B. Furthermore, the structure of the amplifier unit 41-2 may be the same as, or different from the structure of the amplifier unit 41-1.

The first transistor MC1 and the second transistor MC2 may be connected in series between the power supply voltage VDD and a ground terminal. The second transistor MC2 may constitute a current mirror circuit together with the third transistor MC3 and the first current source Ic1. The first transistor MC1 may constitute a current mirror circuit together with the second load transistor MB2 of the buffer ramp RB.

A gate voltage of the second load transistor MB2 of the ramp buffer RB may be scaled by current-voltage characteristics of the first and second transistors MC1 and MC2. For example, the gate voltage of the second load transistor MB2 may have a value obtained by scaling the gate voltage of the second transistor MC2 using a transconductance ratio of the first and second transistors MC1 and MC2.

Current flowing to a drain of the second load transistor MB2 may also vary as the gate voltage of the second load transistor MB2 varies. Drain current of the second load transistor MB2 may flow to a second node to drop the amplitude of the ramp voltage signal Vramp by the amplitude of the second compensation voltage signal Vcomp2.

In some examples embodiments, the second compensation circuit 40-2 may amplify the change in the magnitude of the power supply voltage VDD to generate the second compensation voltage signal Vcomp2 given by Equation 2.

$$V_{comp2} = \left( \frac{C1}{C1 + C2} \right) \left( \frac{g_{m,MC2}}{g_{m,MC1}} \right) \left( \frac{g_{m,MB2}}{g_{m,MB4}} \right) \Delta VDD \qquad \text{Equation (2)}$$

where $g_{m,MC1}$ denotes transconductance of the first transistor MC1 of the second compensation circuit 40-2, denotes transconductance of the second transistor MC2 of the second compensation circuit 40-2, $g_{m,MB2}$ denotes transconductance of the second load transistor MB2 of the ramp buffer RB, $g_{m,MB4}$ denotes transconductance of the input transistor MB4 of the ramp buffer RB, $$\frac{1}{C1+C2}$$

denotes an amplification rate A when the amplifier unit 41-2 is configured as illustrated in FIG. 6B, ΔVDD denotes an amount of variation in the power supply voltage VDD.

Referring to Equation 2, the second compensation circuit 40-2 may change the transconductance of each of the first and second transistors MC1 and MC2 to adjust the amplitude of the second compensation voltage signal Vcomp2.

The ramp buffer RB may output a ramp voltage Vramp' to the comparator COMP. The ramp voltage Vramp' may be calibrated using the first and second compensation voltage signals Vcomp1 and Vcomp2. In some example embodiments, the calibrated ramp voltage Vramp' may be generated by adding the first and second compensation voltage signals Vcomp1 and Vcomp2 to the ramp voltage signal Vramp. The calibrated ramp voltage signal Vramp' may be transferred to the compactor COMP to be used to generate a comparison signal with the output signal $V_{PN}$ of each of the unit pixels PX.

Figure 7:
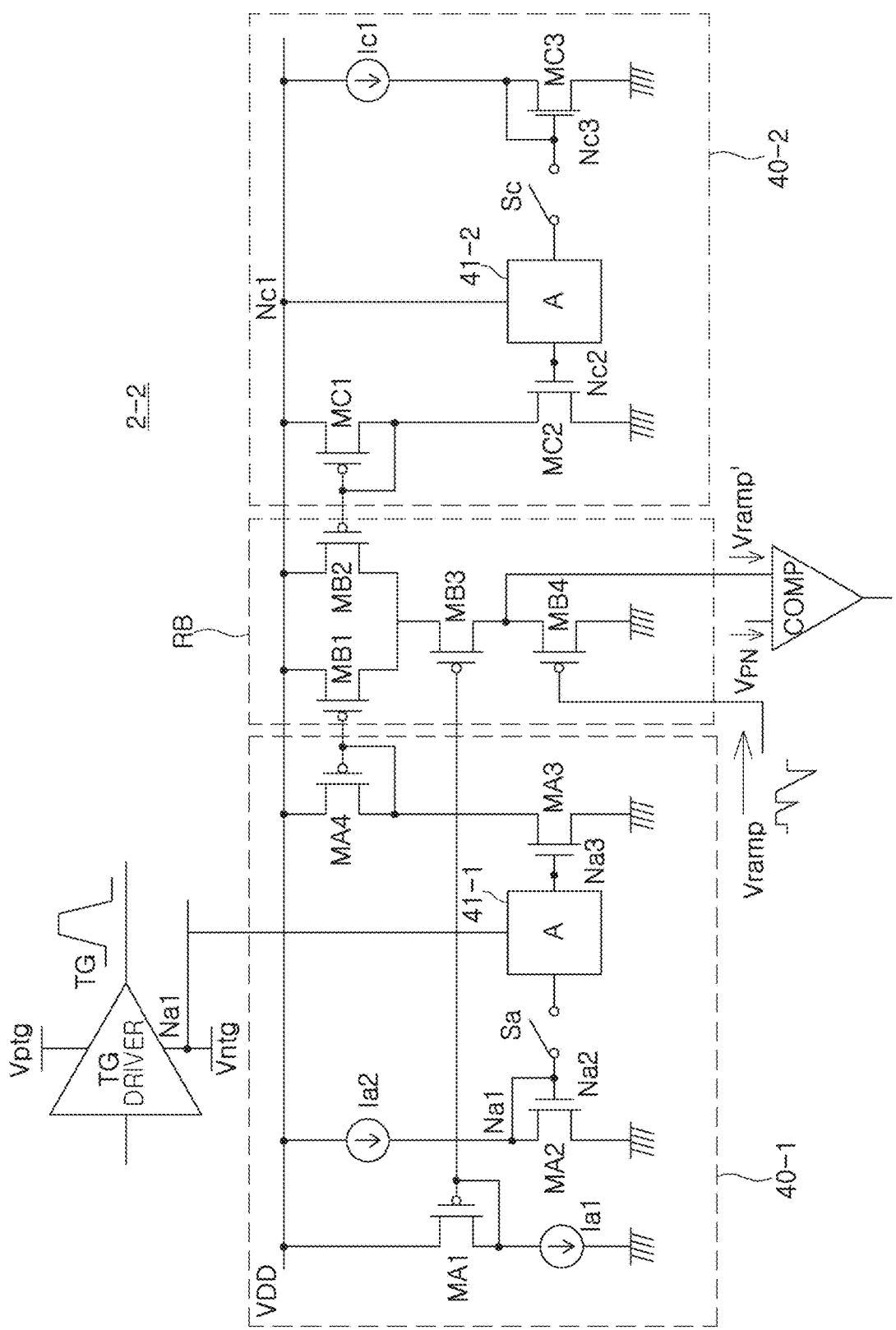
FIG. 7 is a partial equivalent circuit diagram illustrating an example of the image sensor in FIG. 4.

FIG. 7 is a partial equivalent circuit diagram illustrating an example embodiment of the image sensor in FIG. 4.

Referring to FIG. 7, an image sensor 2_2 may include a ramp buffer RB, a first compensation circuit 40-1, and a second compensation circuit 40-2.

The first compensation 40-1 may include first to fourth transistors MA1 to MA4, first and second current sources Ia1 and Ia2, and an amplifier unit 41-1. The first compensation circuit 40-1 may further include a sampling switch Sa in a current mirror including the second and third transistors MA2 and MA3. The sampling switch Sa may be connected between a second node Na2 and a third node Na3 to sample a gate voltage of the third transistor MA3.

The second compensation circuit 40-2 may include first to third transistors MC1 to MC3, a first current source Ia1, and an amplifier unit 41-2. The second compensation circuit 40-2 may further include a sampling switch Sc in the current mirror including the second transistors MC2 and MC3. The sampling switch Sc may be connected between a second node Nc2 and a third node Nc3 to sample a gate voltage of the second transistor MC2.

In the case in which the amplifier units 41-1 and 41-2 include variable capacitors C1 and C2 as illustrated in FIG. 6B, the variable capacitors C1 and C2 of the amplifier units 41-1 and 41-2 may be charged when the sampling switches Sa and Sc are turned on, and a voltage charged to each of the variable capacitors C1 and C2 may be maintained even when the sampling switches Sa and Sc are turned off. The sampling switches Sa and Sc may be or include transistors; however, inventive concepts are not limited thereto.

Figure 8:
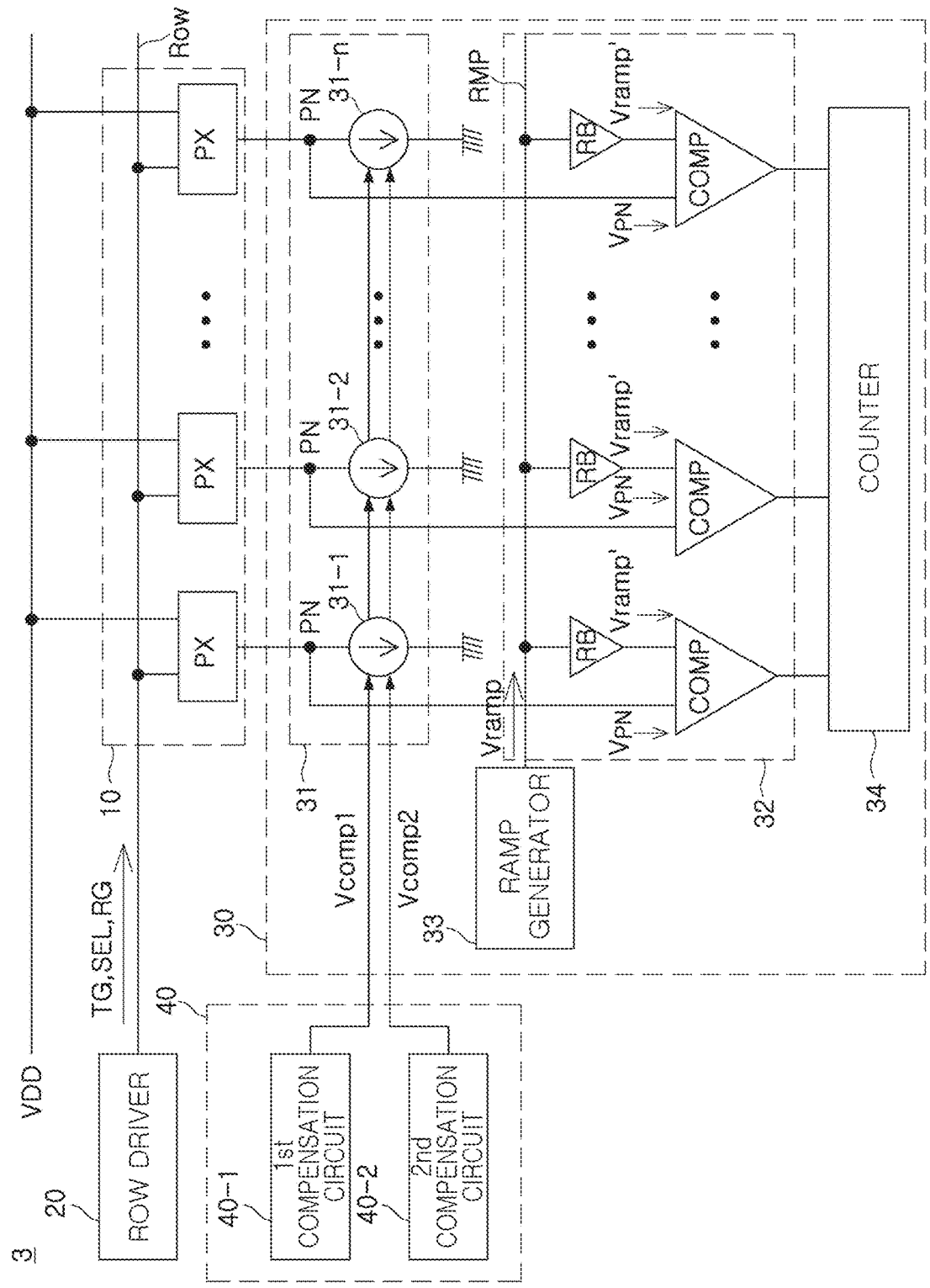
FIG. 8 is a block diagram of an image sensor according to some example embodiments of inventive concepts.

FIG. 8 is a block diagram of an image sensor according to some example embodiments of inventive concepts.

Referring to FIG. 8, an image sensor 3 may include a pixel array 10, a row driver 20, a readout circuit 30, and a compensation circuit 40.

The pixel array 10 may include a plurality of unit pixels PX disposed at intersections of row lines ROW and column lines COL.

The readout circuit 30 may include a pixel bias circuit 31, a sampler 32, a ramp generator 33, and a counter 34.

The pixel bias circuit 31 may be connected between an output terminal PN of each of the unit pixels PX and a ground terminal, and may generate bias current to drive each of the unit pixels PX. In addition, the pixel bias circuit 31 may compensate for noise added to an output signal $V_{PN}$ of each of the unit pixels PX using compensation voltage signals Vcomp1 and Vcomp2, received from the compensation circuit 40.

The compensation circuit 40 may include a first compensation circuit 40-1 generating a first compensation voltage signal Vcomp1 to compensate for a first noise component. The compensation circuit 40 may include a second compensation circuit 40-2 generating a second compensation voltage signal Vcomp2 to compensate for a second noise component.

In some example embodiments, the first compensation circuit 40-1 may generate the first compensation voltage signal Vcomp1 to compensate for horizontal noise added to the output signal $V_{PN}$ of each of the unit pixels PX. The second compensation circuit 40-2 may generate the second compensation voltage signal Vcomp2 to compensate for power noise added to the output signal $V_{PN}$ of each of the unit pixels PX.

The pixel bias circuit 31 may compensate for first and second noise components, added to the output signal $V_{PN}$ of each of the unit pixels PX, using the first and second compensation voltages signals Vcomp1 and Vcomp2 generated by the first and second compensation circuits 40-1 and 40-2. For example, the pixel bias circuit 31 may calibrate the output signal $V_{PN}$ of each of the unit pixels PX by adding the first and second compensation voltage signals Vcomp1 and Vcomp2 to the output signal $V_{PN}$ of each of the unit pixels PX, and may output the calibrated output signal $V_{PN}$ of each of the unit pixels PX. The calibrated output signal $V_{PN}$ of each of the unit pixels PX may be transferred to the comparator COMP to be used to generate a comparison signal CMP together with a ramp voltage signal Vramp.

In FIG. 8, the compensation circuit 40 including the two compensation circuits 40-1 and 40-2 is illustrated. However, the configuration of the compensation circuit 40 is merely example and is not intended to example embodiments of inventive concepts. For example, the compensation circuit 40 may include a plurality of different compensation circuits depending on type and/or number of noise components.

The sampler 32 may include a comparator COMP configured to output a comparison signal between the ramp voltage signal Vramp, generated by the ramp generator 33, and the output signal $V_{PN}$ of each of the unit pixel PX. In some example embodiments, the sampler 32 may further include a ramp buffer RB configured to buffer the ramp voltage signal Vramp on a front end of the compactor COMP and to output the buffered ramp voltage signal Vramp.

The counter 34 may generate a digital signal DS using the comparison signal CMP output from the sampler 32. For example, the counter 34 may generate the digital signal DS based on the comparison signal CMP and a clock signal generated from a control logic 60.

The image sensor 3 according to some example embodiments may simultaneously compensate for various noise components, added to the output signal $V_{PN}$ of each of the unit pixels PX, to improve noise characteristics and linearity of an image sensor and to optimize performance of the image sensor. The image sensor 3 according to some example embodiments may reduce, e.g. significantly reduce, an increase in size and/or power consumption while including a plurality of compensation circuits. Hereinafter, example embodiments of the image sensor 3 will be described with reference to FIGS. 9 and 10.

Figure 9:
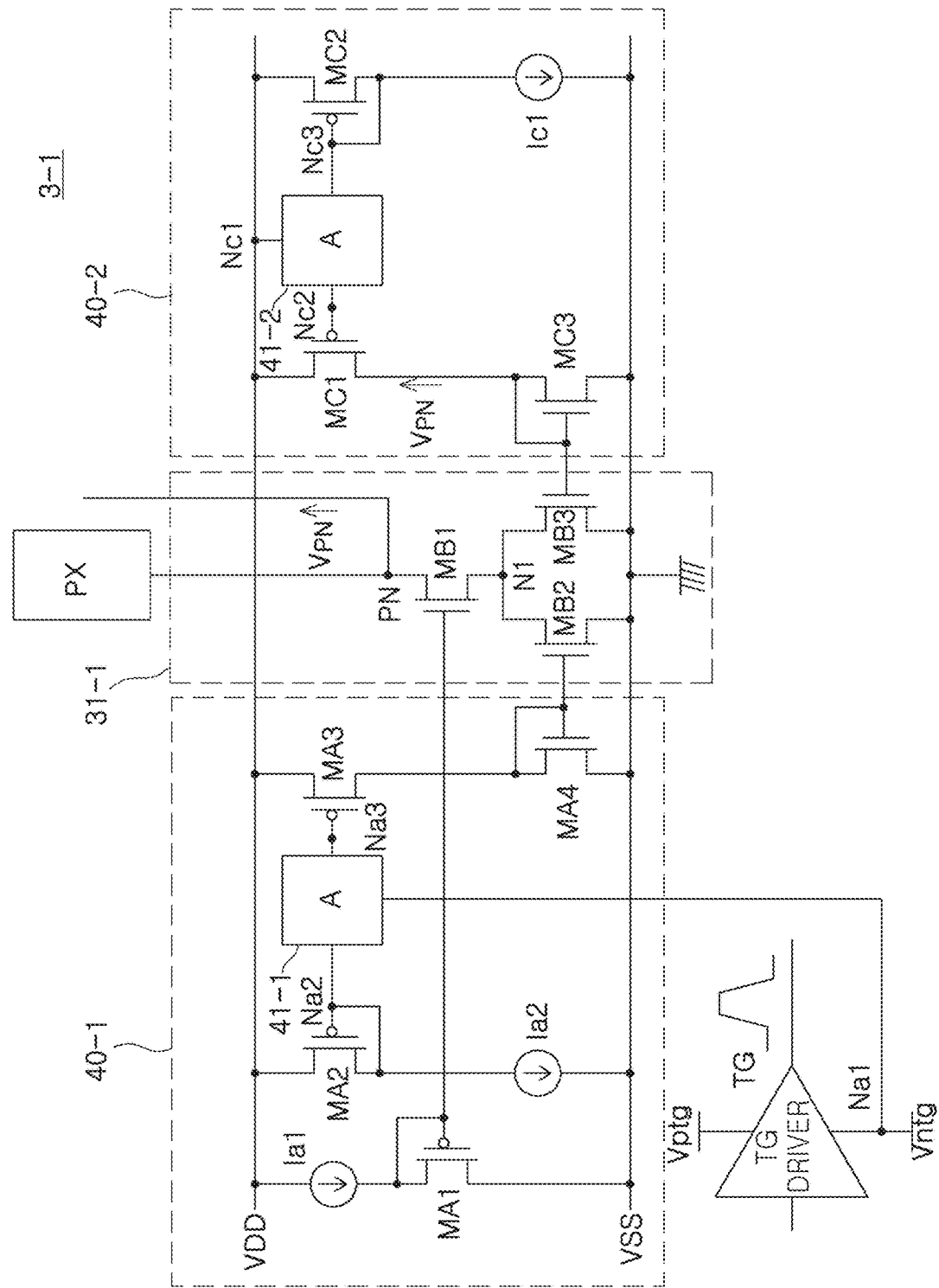
FIG. 9 is a partial equivalent circuit diagram illustrating an example of the image sensor of FIG. 8.

FIG. 9 is a partial equivalent circuit diagram illustrating an example of the image sensor of FIG. 8.

Referring to FIG. 9, an image sensor 3_1 may include a pixel bias circuit 31-1, a first compensation circuit 40-1, and a second compensation circuit 40-2.

The pixel bias circuit 31-1 may supply bias current to each of unit pixels PX to drive them.

The pixel bias circuit 31-1 may compensate for a first noise component added to an output signal $V_{PN}$ of each of the unit pixels PX, by using a first compensation voltage signal Vcomp1 received from the first compensation circuit 40-1. For example, the pixel bias circuit 31-1 may compensate for horizontal noise, added to the output signal $V_{PN}$, by adding the first compensation voltage signal Vcomp1, received from the first compensation circuit 40-1, to the output signal $V_{PN}$.

The pixel bias circuit 31-1 may compensate for a second noise component added to the output signal $V_{PN}$, by using a second compensation voltage signal Vcomp2 received from the second compensation circuit 40-2. For example, the pixel bias circuit 31-1 may compensate for power noise, added to the output signal $V_{PN}$, by adding the second compensation voltage Vcomp2, received from the second compensation circuit 40-2, to the output signal $V_{PN}$.

The pixel bias circuit 31-1 may include a first transistor MB1 connected between a pixel node PN and a first node N1, and second and third transistors MB2 and MB3 connected in parallel between the first node N1 and a ground terminal. Although the two transistors MB1 and MB2 connected in parallel between the first node N1 and the ground terminal, are illustrated in FIG. 9, they are merely example and are not intended to limit example embodiments of inventive concepts. For example, the number of transistors, connected in parallel between the first node N1 and the ground terminal, may be adjusted depending on type or number of noise components. Furthermore, although transistors MB1 to MB3 are illustrated as being NMOS transistors, inventive concepts are not limited thereto. For example, at least one of transistors MB1 to MB3 may be PMOS transistors.

A gate of the second transistor MB2 may be connected to the first compensation circuit 40-1, and a gate of the third transistor MB3 may be connected to the second compensation circuit 40-2.

The first compensation circuit 40-1 may generate a first compensation voltage Vcomp1 to compensate for a first noise component added to the output signal $V_{PN}$ of each of the unit pixels PX. For example, the first compensation circuit 40-1 may generate the first compensation voltage signal Vcomp1 by amplifying a change in magnitude of a transfer control signal TG to compensate for horizontal noise added to a pixel voltage signal of the unit pixel PX. When a small, e.g. a minimum, voltage Vntg of the transfer control signal TG varies depending on variation of the transfer control signal TG, the first compensation circuit 40-1 may generate the first compensation voltage Vcomp1 by amplifying the variation of the voltage Vntg of the transfer control signal TG by a specific (or, alternatively, predetermined) gain A.

The first compensation circuit 40-1 may include first to fourth transistors MA1 to MA4, first and second current sources Ia1 and Ia2, and an amplifier unit 41-1. Although transistors MA1 to MA3 are illustrated as being PMOS transistors, and transistor MA4 is illustrated as being an NMOS transistor, inventive concepts are not limited thereto.

The amplifier unit 41-1 may be connected between a gate of the second transistor MA2 and a gate of the third transistor MA3 to amplify an input of a horizontal line, for example, a change in magnitude of the transfer control signal TG by a specific (or, alternatively, predetermined) gain A. The amplifier unit 41-1 may include an amplifier as described above with reference to FIG. 6A or 6B; e.g. the amplifier unit 41-1 may include first and second variable capacitors C1 and C2. The amplifier unit 41-1 may have various structures, capable of adjusting the gain A, in addition to the examples of FIGS. 6A and 6B.

The third and fourth transistors MA3 and MA4 may be connected in series between a power supply voltage VDD and a ground terminal. The third transistor MA3 may constitute a current mirror circuit together with the second transistor MA2 and the second current source Ia2. The fourth transistor MA4 may constitute a current mirror circuit together with the second transistor MB2.

A gate voltage of the second transistor MB2 of the pixel bias circuit 31-1 may be scaled by current-voltage characteristics of the third transistor MA3 and the fourth transistor MA4. For example, a gate voltage of the first transistor MB1 of the pixel bias circuit 31-1 may have a value obtained by scaling a gate voltage of the third transistor MA3 using a transconductance ratio of the third and fourth transistors MA3 and MA3. In some examples embodiments, the first compensation circuit 40-1 may adjust the amplitude of the first compensation voltage signal Vcomp1 by changing transconductance of at least one of third and fourth transistors MA3 and MA4.

Current flowing to a drain of the second transistor MB2 of the pixel bias circuit 31-1 may also vary as the gate voltage of the second transistor MB2 of the pixel bias circuit 31-1 varies. Drain current of the second transistor MB2 of the pixel bias circuit 31-1 may flow to the second node N2 to drop the amplitude of the output signal $V_{PN}$ of each of the unit pixels PX by the amplitude of the first compensation voltage signal Vcomp1.

The second compensation circuit 40-2 may generate the second compensation voltage signal Vcomp2 to compensate for second noise added to the output signal $V_{PN}$ of each of the unit pixels PX. For example, the second compensation circuit 40-2 may generate the second compensation voltage signal Vcomp2 to remove the power noise added to the output signal $V_{PN}$ by a ripple voltage of the power supply voltage VDD. In this case, the second compensation circuit 40-2 may generate the second compensation voltage signal Vcomp2 by amplifying a change in magnitude of the power supply voltage VDD.

The second compensation circuit 40-2 may include first to third transistors MC1 to MC3, a first current source Ic1, and an amplifier unit 41-2.

The amplifier unit 41-2 may be connected between a gate of the first transistor MC1 and a gate of the second transistor MC2 to amplify the change in magnitude of the power supply voltage VDD by a predetermined gain A. The amplifier unit 41-2 may have various structures, capable of adjusting the gain A, in addition to the structure described above with reference to FIGS. 6A and 6B. Furthermore, the amplifier unit 41-2 may have the same structure as, or different structure than, the amplifier unit 41-1.

The first transistor MC1 and the second transistor MC2 may be connected in series between the power supply voltage VDD and the ground terminal. The first transistor MC1 may constitute a current mirror circuit together with the third transistor MC3 and the first current source Ic1. The first transistor MC1 may constitute a current mirror circuit together with the third transistor MB3 of the pixel bias circuit 31-1.

A gate voltage of the third transistor MB3 of the pixel bias circuit 31-1 may be scaled by current-voltage characteristics of the first transistor MC1 and the second transistor MC2. For example, the gate voltage of the third transistor MB3 of the pixel bias circuit 31-1 may have a value obtained by scaling the gate voltage of the second transistor MC2 using a transconductance ratio of the first and second transistors MC1 and MC2. In some examples embodiments, the second compensation circuit 40-2 may adjust amplitude of the second compensation voltage signal Vcomp2 by changing transconductance of at least one of the first and second transistors MC1 and MC2.

Current flowing to a drain of the third transistor MB3 of the pixel bias circuit 31-1 may also vary as the gate voltage of the third transistor MB3 of the pixel bias circuit 31-1 varies. Drain current of the third transistor MB3 of the pixel bias circuit 31-1 may flow to a second node N2 to drop the amplitude of the output signal $V_{PN}$ by the amplitude of the second compensation voltage signal Vcomp2.

The pixel bias circuit 31-1 may output a signal Vramp', calibrated using the first and second compensation voltage signals Vcomp1 and Vcomp2, through a pixel node PX. In some example embodiments, the calibrated output Vramp' of each of the unit pixels PX may be generated by adding the first and second compensation voltage signals Vcomp1 and Vcomp2 to a pre-calibrated output Vramp of each of the unit pixels PX. The calibrated output Vramp' may be transferred to the comparator COMP to generate a comparison signal with the output signal $V_{PN}$.

Figure 10:
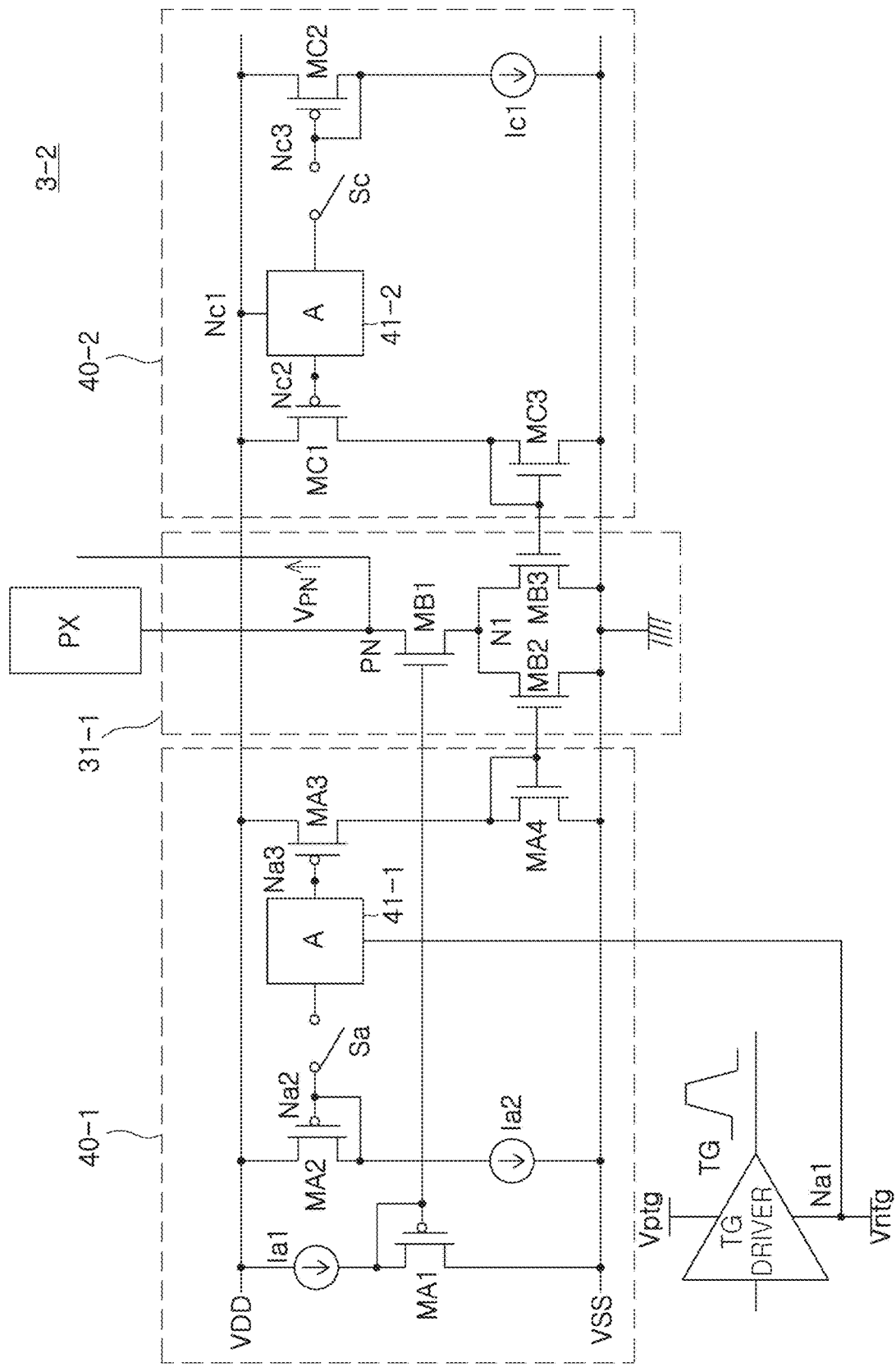
FIG. 10 is a partial equivalent circuit diagram illustrating an example of the image sensor of FIG. 8.

FIG. 10 is a partial equivalent circuit diagram illustrating an example of the image sensor of FIG. 8.

Referring to FIG. 10, an image sensor 3_2 may include a pixel bias circuit 31-1, a first compensation circuit 40-1, and a second compensation circuit 40-2.

The first compensation circuit 40-1 may include first to fourth transistors MA1 to MA4, first and second current sources Ia1 and Ia2, and an amplifier unit 41-1. The first compensation circuit 40-1 may further include a sampling switch Sa in a current mirror including the second and third transistors MA2 and MA3. The sampling switch Sa may be connected between a second node Na2 and a third node Na3 to sample a gate voltage of the third transistor MA3.

The second compensation circuit 40-2 may include first to third transistors MC1 to MC3, a first current source Ia1, and an amplifier unit 41-2. The second compensation circuit 40-2 may further include a sampling switch Sc in a current mirror including the second and third transistors MC2 and MC3. The sampling switch Sc may be connected between a second node Nc2 and a third node Nc3 to sample a gate voltage of the second transistor MC2. The sampling switches Sa and Sc may be or correspond to transistors; however, inventive concepts are not limited thereto.

In the case in which the amplifier units 41-1 and 41-2 include variable capacitors C1 and C2 as illustrated in FIG. 6, the variable capacitors C1 and C2 of the amplifier units 41-1 and 41-2 may be charged when the sampling switches Sa and Sc are turned on, and a voltage charged to the variable capacitors C1 and C2 may be maintained even when the sampling switches Sa and Sc are turned off.

Figure 11:
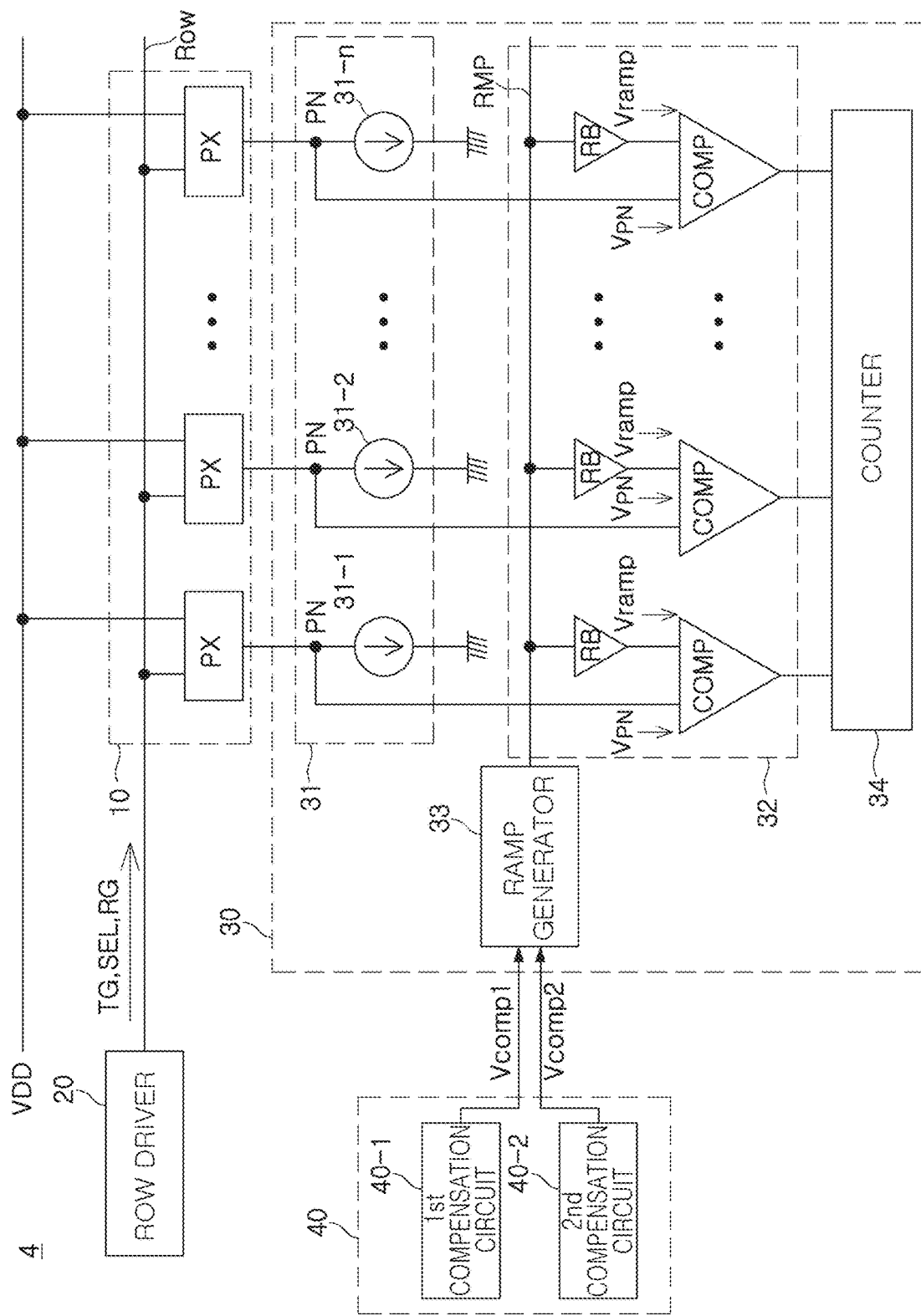
FIG. 11 is a block diagram of an image sensor according to some example embodiments of inventive concepts.

FIG. 11 is a block diagram of an image sensor according to some example embodiments of inventive concepts;

Referring to FIG. 11, an image sensor 4 may include a pixel array 10, a row driver 20, a compensation circuit 40, and a readout circuit 30.

The pixel array 10 may include a plurality of unit pixels PX arranged at intersections of row lines ROW and column lines COL. A row address and a row scan of the pixel array 10 may be controlled by the row driver 20.

The compensation circuit 40 may generate a compensation voltage signal Vramp to compensate for one or more noise components added to the ramp voltage signal Vramp generated by a ramp generator 33.

The compensation circuit 40 may include a first compensation circuit 40-1 and a second compensation circuit 40-2. The first compensation circuit 40-1 may generate a first compensation voltage signal Vcomp1 to compensate for a first noise component. The first noise component may be, for example, horizontal noise added to the ramp voltage Vramp by coupling, e.g. capacitive coupling, between a transfer control signal line and a column line. The second compensation circuit 40-2 may generate a second compensation voltage signal Vcomp2 to compensate for a second noise component. The second noise component may be, for example, power noise added to the ramp voltage signal Vramp. In FIG. 11, the compensation circuit 40 including the two compensation circuits 40-1 and 40-2 is illustrated. However, the configuration of the compensation circuit 40 is merely example and is not intended to example embodiments of inventive concepts. For example, the compensation circuit 40 may include a plurality of different compensation circuits depending on type and/or number of noise components.

The readout circuit 30 may include a pixel bias circuit 31, a sampler 32, a ramp generator 33, and a counter 34.

The pixel bias circuit 231 may be connected between an output terminal PN of each of the unit pixels PX and a ground terminal, and may generate bias current to drive each of the unit pixels PX.

The ramp generator 33 may generate a ramp voltage signal Vramp', increasing or decreasing in the form of a ramp, and may provide the ramp voltage signal Vramp' to the sampler 32. The ramp voltage signal Vramp', generated by the ramp generator 33, may be a voltage signal in which noise is compensated using the compensation voltage signals Vcomp1 and Vcomp2 provided by the compensation circuit 40. For example, the ramp generator 33 may generate a ramp voltage signal Vramp based on the power supply voltage VDD and a clock signal, and may output the ramp voltage signal Vramp after calibrating the ramp voltage signal Vramp using the first compensation voltage signal Vcomp1, transferred from the first compensation circuit 40-1, and the second compensation voltage signal Vcomp2 transferred from the second compensation circuit 40-2. In some example embodiments, the ramp generator 323 may generate the calibrated ramp voltage signal Vramp' by adding the first compensation voltage signal Vcomp1 and the second compensation voltage signal Vcomp2 to an initial ramp voltage signal Vramp.

The calibrated ramp voltage signal Vramp' may be transferred to a comparator COMP through a ramp buffer RB to be used to generate a comparison signal CMP together with an output signal $V_{PN}$ of each of the unit pixels PX.

The comparator COMP may compare the output signal $V_{PN}$ with the ramp voltage signal Vramp', output from the ramp buffer RB, to output the comparison signal CMP.

The counter 34 may generate a digital signal DS using the comparison signal CMP output from the sampler 32. For example, the counter 34 may generate the digital signal DS based on the comparison signal CMP and a clock signal provided from a control logic 60.

The image sensor according to some example embodiments may simultaneously compensate for various noise components, added to the ramp voltage signal Vramp, to improve noise characteristics, linearity, and the like of an image sensor and to optimize performance of the image sensor. Moreover, the image sensor 4 according to some example embodiments may significantly reduce an increase in size and power consumption while including a plurality of compensation circuits. Hereinafter, an example of the image sensor 4 will be described with reference to FIG. 12.

Figure 12:
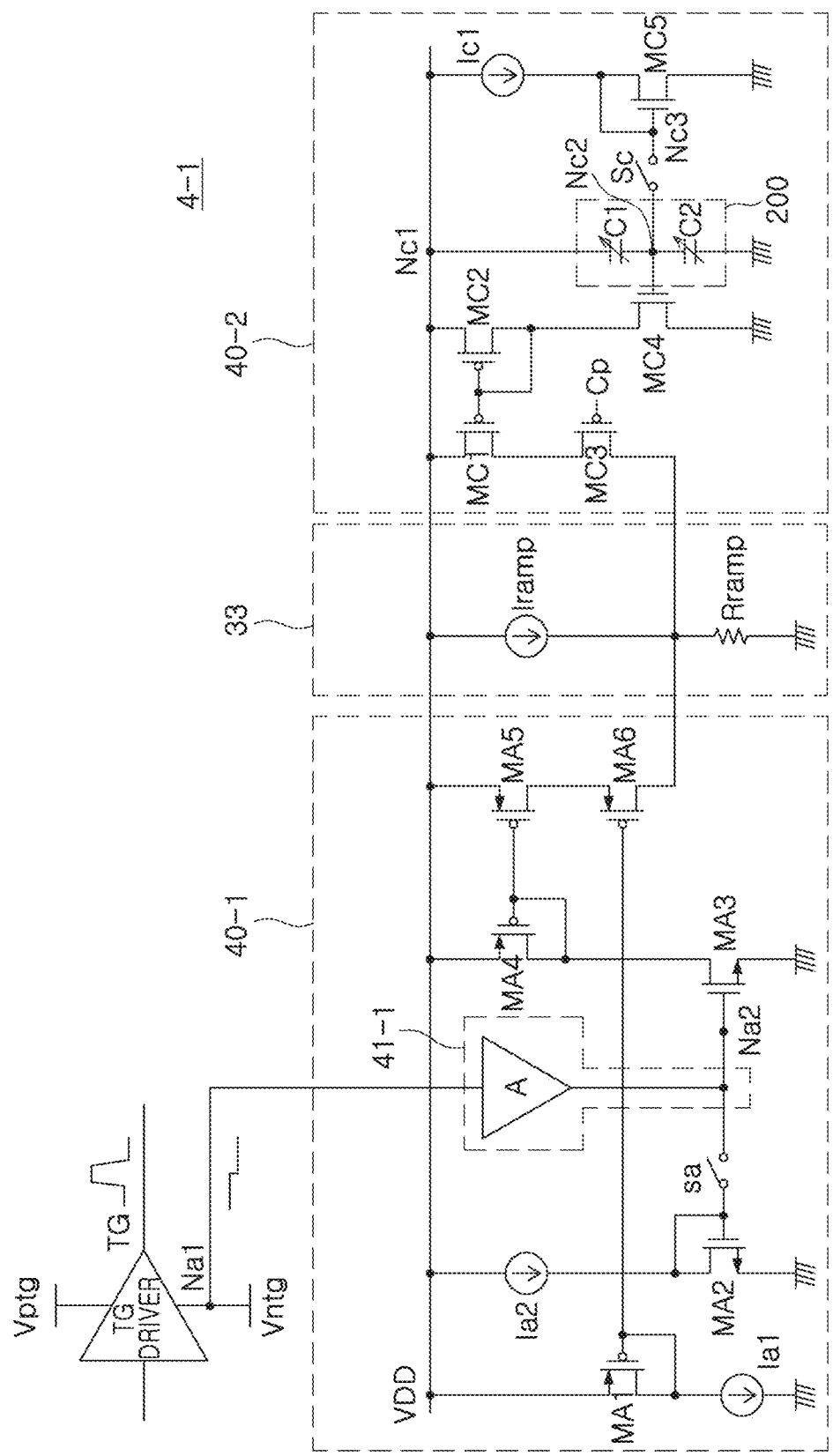
FIG. 12 is a partial equivalent circuit diagram illustrating an example of the image sensor of FIG. 11.

FIG. 12 is a partial equivalent circuit diagram illustrating an example of the image sensor 4 of FIG. 11.

Referring to FIG. 12, an image sensor 4_1 may include a ramp generator 33, a first compensation circuit 40-1, and a second compensation circuit 40-2.

The ramp generator 33 may generate a ramp voltage signal Vramp which linearly varies at a constant rate of a slope.

The ramp generator 33 may include a ramp current source Iramp and a ramp resistor Rramp connected between a power supply voltage VDD and a ground terminal. The ramp generator 33 may generate a ramp voltage Vramp by adjusting current flowing to the ramp resistor Rramp.

A first compensation circuit 40-1 and a second compensation circuit 40-2 may be connected in parallel to both ends of the current source Iramp.

The first compensation circuit 40-1 may generate a first compensation voltage signal Vcomp1 to compensate for a first noise component of the ramp voltage signal Vramp. The first noise component may include, for example, horizontal noise generated by coupling between a horizontal line and a column line.

The first compensation circuit 40-1 may include first to sixth transistors MA1 to MA6, first and second current sources Ia1 and Ia2, and an amplifier unit 41-1. The first compensation circuit 40-1 may further include a sampling switch Sa in a current mirror circuit including the second and third transistors MA2 and MA3. The sampling switch Sa may be connected between a gate of the second transistor MA2 and a second node Na2 to sample a gate voltage of the third transistor MA3. Although transistors MA1, MA4, MA5, and MA6 are illustrated as being PMOS transistors, and transistors Ma2 and MA3 are illustrated as being NMOS transistors, inventive concepts are not limited thereto.

The amplifier unit 41-1 may be connected between the gate of the second transistor MA2 and a gate of the third transistor MA3 to amplify a change in amplitude of an input of the horizontal line by a predetermined gain A. The amplifier unit 41-1, including a single amplifier, is illustrated in FIG. 12 but is merely example and is not intended to limit example embodiments of inventive concepts.

The second compensation circuit 40-2 may generate a second compensation voltage signal Vcomp2 to compensate for a second noise of the ramp voltage signal Vramp. The second noise component may include, for example, power noise.

The second compensation circuit 40-2 may include first to fifth transistors MC1 to MC5 and an amplifier unit 41-2. The second compensation circuit 40-2 may further include a sampling switch Sc in a mirror circuit including the third and fourth transistors MC3 and MC3. The sampling switch Sc may be connected between a second node Nc2 and a third node Nc3 to sample a gate voltage of the third transistor MC3. Although transistors MC1, MC2, and MC3 are illustrated as being PMOS transistors, and transistors MC4 and MC5 are illustrated as being NMOS transistors, inventive concepts are not limited thereto.

The amplifier unit 41-2 may be connected between a gate of the third transistor MC3 and a gate of the fourth transistor MC4 to amplify a change in magnitude of the power supply voltage VDD by a predetermined gain A. The amplifier unit 41-2, including two variable capacitors C1 and C2 connected between the first node Nc1 and the ground terminal in series, is illustrated in FIG. 12, but is merely example and is not intended to limit example embodiments of inventive concepts. Furthermore, the amplifier unit 41-1 may have the same structure as, or a different structure from, the amplifier unit 41-1; inventive concepts are not limited thereto.

The ramp generator 33 may generate a ramp voltage Vramp' based on a ramp current source Iramp, a first compensation voltage signal Vcomp1 transferred from the first compensation circuit 40-1, and a second compensation voltage signal Vcomp2 transferred from the second compensation circuit 40-2.

Figure 13:
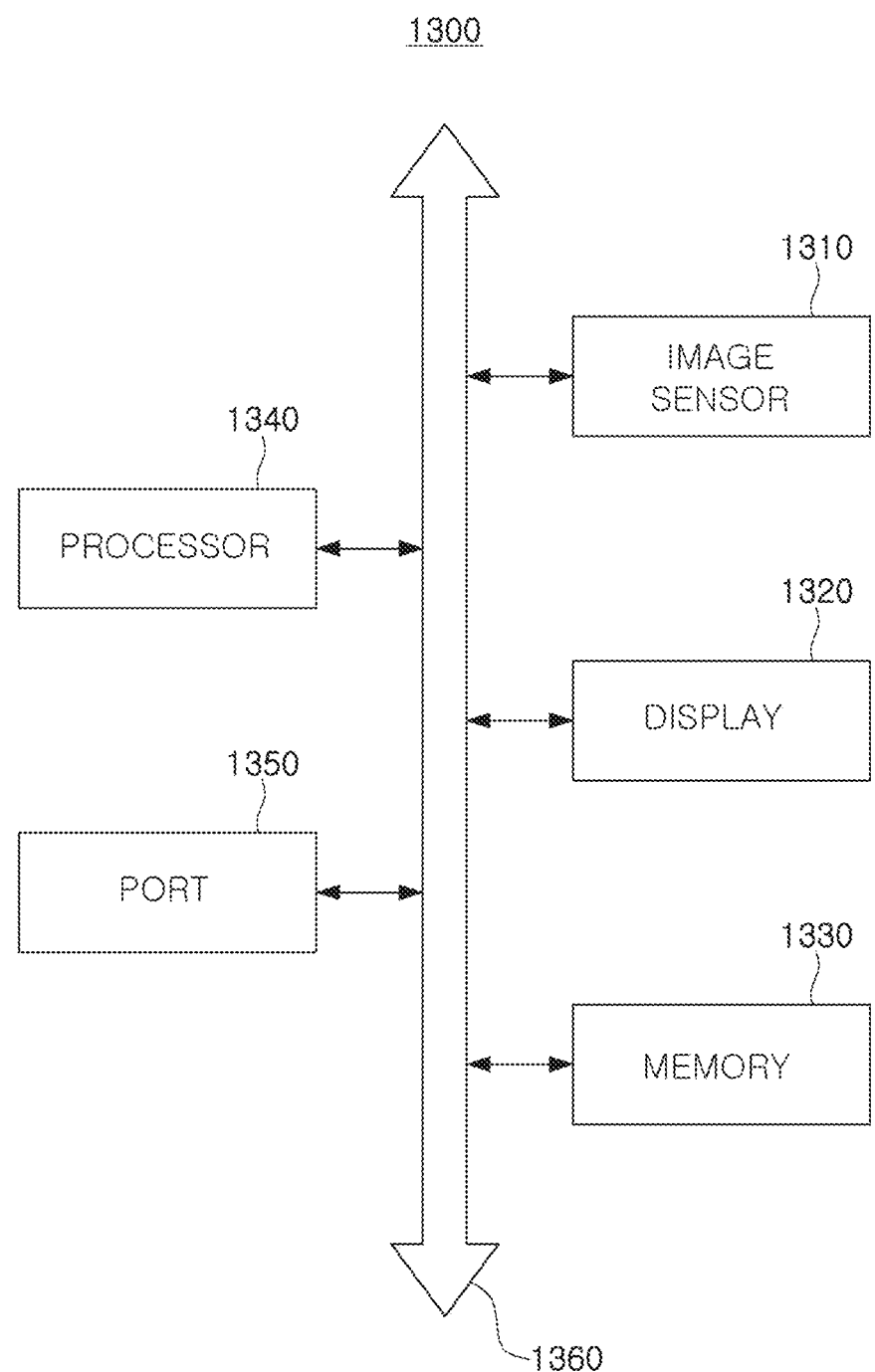
FIG. 13 is a block diagram of an electronic device including an image sensor according to example embodiments of inventive concepts.

FIG. 13 is a block diagram of an electronic device including an image sensor according to example embodiments of inventive concepts.

Referring to FIG. 13, an electronic device 1300 may include an image sensor 1310, a display 1320, a memory 1330, a processor 1340, a port 1350, and/or the like. The electronic device 1300 may further include a wired/wireless communications device, a power supply, and the like. Among the components illustrated in FIG. 13, the port 1350 may be provided to allow the electronic device 1300 to communicate with a video card, a sound card, a memory card, a USB device, and the like. The electronic device 1300 may include a smartphone, a table PC, a smart wearable device, and/or the like, in addition to a general desktop computer or a laptop computer.

The processor 1340 may perform a specific calculation, a command, a task, and/or the like. The processor 1340 may be and/or may include a central processing unit (CPU), a microprocessor unit (MCU), a system on chip (SoC), and/or the like, and may communicate with the image sensor 1310, the display 1320, and the memory device 1330 as well as with other devices, connected to the port 1350, through the bus 1060.

The memory 1330 may be a storage medium configured to store data, required for operation of the electronic device 1300, multimedia data, and/or the like. The memory 1330 may include a volatile memory such as a random access memory (RAM), and/or a nonvolatile memory such as a flash memory, and/or the like. As a storage device, the memory 1330 may also include at least one of a solid state drive (SSD), a hard disk drive (HDD), and an optical drive (ODD). The display device 1320 may include an input device such as a keyboard, a mouse, a touchscreen, and/or the like, and an output device such as a display, an audio output portion, and/or the like.

The image sensor 1310 may be mounted on a package substrate to be connected to the processor 1340 by the bus 1360 and/or another communications structure. The image sensor 1310 may be employed in the electronic device 1300 in various forms suggested in the above-described example embodiments described with reference to FIGS. 1 to 12.

As described above, an image sensor according to some example embodiments of inventive concepts may simultaneously compensate for horizontal noise and power noise added to at least one of an output value of a unit pixel or a ramp voltage, to improve noise characteristics and linearity of an image sensor.

Moreover, the image sensor according to some example embodiments of inventive concepts may enable a significant reduction in, or reduce any increase in, size and/or may reduce power consumption while including a plurality of compensation circuits While some example embodiments have been shown and described above, it will be apparent to those of ordinary skill in the art that modifications and variations could be made without departing from the scope of inventive concepts as defined by the appended claims.

What is claimed is:

1. An image sensor comprising:
a unit pixel connected to a row line extending in a horizontal direction and a column line extending in a vertical direction, and to which a power supply voltage is applied as a reset voltage,
a row driver configured to output at least one voltage to the row line,
a first compensation circuit configured to amplify a variation of the at least one voltage, and to output a first compensation voltage signal,
a second compensation circuit configured to amplify a variation of a power supply voltage, and to output a second compensation voltage signal,
a ramp buffer configured to receive a ramp voltage signal from a ramp generator, and to adjust the ramp voltage signal based on the first compensation voltage signal received from the first compensation circuit and the second compensation voltage signal received from the second compensation circuit.

2. The image sensor of claim 1, wherein the ramp buffer comprises a first load transistor to receive the first compensation voltage signal, and a second load transistor connected in parallel to the first load transistor to receive the second compensation voltage signal.

3. The image sensor of claim 2, wherein the ramp buffer further comprises a input transistor connected to each of the first and the second load transistors in series, having a gate which receive the ramp voltage signal.

4. The image sensor of claim 3, wherein the ramp buffer further comprises a cascade transistor connected in series between the first and the second load transistors and the input transistor to output a signal compensating the ramp voltage signal.

5. The image sensor of claim 2, wherein the first compensation circuit generates the first compensation voltage signal by scaling the variation in the at least one voltage of the row line by a first rate based on a transconductance of the first load transistor, and
the second compensation circuit generates the second compensation voltage signal by scaling the variation in the power supply voltage by a second rate based on a transconductance of the second load transistor.

6. The image sensor of claim 1, wherein the first compensation circuit and the second compensation circuit comprise an amplifier unit, respectively,
wherein the amplifier unit include a first variable capacitor and a second variable capacitor connected in series.

7. The image sensor of claim 6, wherein the first variable capacitor and the second variable capacitor change each of a capacitance of the variable capacitors based on the variation of the at least one voltage or the variation of the power supply voltage, and adjust an amplification rate of the amplifier unit.

8. The image sensor of claim 1, wherein the first compensation voltage signal is generated by amplifying a variation in a value associated with the minimum voltage of a transfer control signal when the row line corresponds to a transfer control signal (TG) line.

9. The image sensor of claim 1, wherein the first compensation circuit comprises:
a first transistor connected in series to a first current source,
a second transistor and a third transistor constituting a current mirror circuit together with a second current source,
a fourth transistor connected to the third transistor in series, and
an amplifier unit connected between a gate of the second transistor and a gate of the third transistor.

10. The image sensor of claim 9, wherein the first compensation circuit is configured to adjust a gate voltage of a first load transistor of the ramp buffer by changing transconductance of at least one of the third transistor or the fourth transistor.

11. The image sensor of claim 9, wherein the current mirror circuit includes a sampling switch to sample a gate voltage of the third transistor.

12. The image sensor of claim 1, wherein the second compensation circuit comprises:
a first transistor and a second transistor connected in series between a power supply voltage and a ground terminal,
a third transistor constituting a current mirror circuit together with the second transistor and a first current source,
an amplifier unit connected between a gate of the second transistor and a gate of the third transistor.

13. The image sensor of claim 12, wherein the second compensation circuit is configured to adjust a gate voltage of a second load transistor of the ramp buffer by changing transconductance of at least one of the first transistor or the second transistor.

14. The image sensor of claim 12, wherein the current mirror circuit includes a sampling switch to sample a gate voltage of the second transistor.

15. The image sensor of claim 1, wherein the ramp buffer is configured to calibrate the ramp voltage signal and to output the calibrated ramp voltage signal by adding the first compensation voltage signal and the second compensation voltage signal to the ramp voltage signal.

16. An image sensor comprising:
a unit pixel connected to a row line extending in a horizontal direction and a column line extending in a vertical direction, and to which a power supply voltage is applied as a reset voltage,
a row driver configured to output at least one voltage to the row line,
a first compensation circuit configured to amplify a variation of the at least one voltage, and to output a first compensation voltage signal,
a second compensation circuit configured to amplify a variation of a power supply voltage, and to output a second compensation voltage signal,
a pixel bias circuit configured to input a bias current to operate the unit pixel, and to adjust an output of the unit pixel based on the first compensation voltage signal received from the first compensation circuit and the second compensation voltage signal received from the second compensation circuit.

17. The image sensor of claim 16, wherein the pixel bias circuit comprises a first bias transistor to generate the bias current, and a second load transistor connected in series to the first bias transistor to receive the first compensation voltage signal, and a third load transistor connected in parallel to the second load transistor to receive the second compensation voltage signal.

18. An image sensor comprising:
   a unit pixel connected to a row line extending in a horizontal direction and a column line extending in a vertical direction, and to which a power supply voltage is applied as a reset voltage,
   a row driver configured to output at least one voltage to the row line,
   a first compensation circuit configured to amplify a variation of the at least one voltage, and to output a first compensation voltage signal,
   a second compensation circuit configured to amplify a variation of a power supply voltage, and to output a second compensation voltage signal,
   a ramp generator configured to adjust a ramp voltage based on the first compensation voltage signal received from the first compensation circuit and the second compensation voltage signal received from the second compensation circuit, and to output the adjusted ramp voltage signal to a ramp buffer.

19. The image sensor of claim 18, wherein the ramp generator comprises a ramp current source and a ramp resistor connected in series between the power supply voltage and a ground terminal.

20. The image sensor of claim 18, wherein additional transistors are connected between the ramp generator and the first and the second compensation circuit.

* * * * *